US012682345B2

(12) United States Patent
Nemethi

(10) Patent No.: US 12,682,345 B2
(45) Date of Patent: **\*Jul. 14, 2026**

(54) GATED CONTROL FOR BLOCKCHAIN UNITS

(71) Applicant: Veri Labs, Inc., Sacramento, CA (US)

(72) Inventor: Balazs Nemethi, Sacramento, CA (US)

(73) Assignee: Veri Labs, Inc., Sacramento, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/761,230

(22) Filed: Jul. 1, 2024

(65) Prior Publication Data

US 2024/0354758 A1 Oct. 24, 2024

Related U.S. Application Data

(63) Continuation of application No. PCT/US2023/017241, filed on Apr. 3, 2023, which is
(Continued)

(51) Int. Cl.
| | |
|---|---|
| *G06Q 20/38* | (2012.01) |
| *G06Q 20/40* | (2012.01) |
| *H04L 9/32* | (2006.01) |

(52) U.S. Cl.
CPC .......... *G06Q 20/389* (2013.01); *G06Q 20/40* (2013.01); *H04L 9/3218* (2013.01); *G06Q 2220/10* (2013.01)

(58) Field of Classification Search
None
See application file for complete search history.

(56) References Cited

U.S. PATENT DOCUMENTS

| | | | | |
|---|---|---|---|---|
| 10,356,066 B2 * | 7/2019 | Ateniese | .................... | H04L 9/30 |
| 2020/0342539 A1 * | 10/2020 | Doney | .................... | G06Q 40/06 |
| 2021/0374791 A1 | 12/2021 | Kim | | |

FOREIGN PATENT DOCUMENTS

| | | | | |
|---|---|---|---|---|
| WO | WO-2020041794 A1 * | 2/2020 | ........... | G06Q 20/065 |
| WO | WO 2022/178096 A1 | 8/2022 | | |

OTHER PUBLICATIONS

Blue.Fi, "Trade DeFi with KYC/AML" undated, 8 pages, [Online] [Retrieved on Apr. 21, 2023] Retrieved from the internet <URL:https://www.blue.fi/>.

(Continued)

*Primary Examiner* — Christopher Bridges
(74) *Attorney, Agent, or Firm* — Fenwick & West LLP

(57) ABSTRACT

A process may cause a gated autonomous program protocol to be stored on a blockchain. The gated autonomous program protocol is configured to exchange a blockchain unit with a gated wrapped blockchain unit that is exchangeable among blockchain addresses that satisfy one or more gating requirements. The process may verify that an account associated with a particular blockchain address of the blockchain satisfies the one or more gating requirements. The process may cause an issuance of an on-chain verification proof to the particular blockchain address. The on-chain verification proof may be stored on the blockchain as an on-chain representation that the particular blockchain address is verified with the one or more gating requirements. The gated autonomous program protocol verifies the on-chain verification proof before approving a transaction request associated with the gated wrapped blockchain unit that is initiated by the particular blockchain address.

20 Claims, 10 Drawing Sheets

Related U.S. Application Data a continuation of application No. 18/122,255, filed on Mar. 16, 2023, now Pat. No. 11,880,836.

(60) Provisional application No. 63/378,255, filed on Oct. 4, 2022.

(56) References Cited

OTHER PUBLICATIONS

Decentralized Identity Foundation, "Decentralized Identity FAQ," undated, 34 pages, [Online] [Retrieved on Apr. 21, 2023] Retrieved from the internet <URL:https://identity.foundation/faq/>.

ethereum.org, "ERC-20 Token Standard," last edited Apr. 7, 2023, 5 pages, [Online] [Retrieved on Apr. 21, 2023] Retrieved from the internet <URL:https://ethereum.org/en/developers/docs/standards/tokens/erc-20/>.

Etherscan.Io, "Wrapped ETH contract," undated, 3 pages, [Online] [Retrieved on Apr. 21, 2023] Retrieved from the internet <URL: https://etherscan.io/token/0xc02aaa39b223fe8d0a0e5c4f27ead9083c756cc2>.

github.com, "gnosis/canonical-weth/contracts/WETH9.sol," last edited Feb. 28, 2019, 16 pages, [Online] [Retrieved on Apr. 21, 2023] Retrieved from the internet <URL:https://github.com/gnosis/canonical-weth/blob/master/contracts/WETH9.sol >.

Hwang, G-H., "Verification System and Method for Cooperating With Blockchain and Off-Chain Devices", International Trust Machines Corporation, Oct. 28, 2020, pp. 1-19.

Keyring Network, "Keyring Network Homepage" 2023, 1 page, [Online] [Retrieved on Apr. 21, 2023] Retrieved from the internet <URL:https://keyring.network/ >.

Lido.Fi, "Homepage-Liquid Staking for Digital Tokens," undated, 12 pages, [Online] [Retrieved on Apr. 21, 2023] Retrieved from the internet <URL:https://lido.fi/>.

PCT International Search Report and Written Opinion, Patent Cooperation Treaty Application No. PCT/US2023/017241, dated Jun. 22, 2023, 12 pages.

Sealance Corp, "Sealance Corp Homepage" undated, 6 pages, [Online] [Retrieved on Apr. 21, 2023] Retrieved from the internet <URL:https://www.sealance.io/>.

Yang, L. et al., "An access control model based on blockchain master-sidechain collaboration," Cluster Computing, Jan. 14, 2023, pp. 1-21.

United States Office Action, U.S. Appl. No. 18/122,255, filed Jul. 26, 2023, 16 pages.

* cited by examiner

300

400

Verified Wrapper (VW) transfer compliance

GATED CONTROL FOR BLOCKCHAIN UNITS

CROSS REFERENCE TO RELATED APPLICATIONS

This application is a continuation of International Application No. PCT/US2023/017241, filed Apr. 3, 2023, which claims the benefit of U.S. Provisional Application No. 63/378,255 filed Oct. 4, 2022. International Application No. PCT/US2023/017241, filed Apr. 3, 2023, also claims priority to U.S. patent application Ser. No. 18/122,255, "Gated Control for Blockchain Units," filed on Mar. 16, 2023, which claims the benefit of U.S. Provisional Application No. 63/378,255 filed Oct. 4, 2022. The subject matters of all of the foregoing are incorporated herein by reference in their entirety.

FIELD

The disclosure generally relates to access control on blockchain and, more specifically, to the architecture of access requirements for program protocols recorded on a blockchain.

BACKGROUND

Public blockchains, which may include designed immutable ledger systems, such as directed acyclic graphs, are becoming an increasingly important component of the global information infrastructure. Herein, the term blockchain may be used as a generic term, intended to encompass the family of related public ledger technologies, which serve a plethora of use cases, including the development of program protocols that are recorded on fully programmable and Turing-complete systems such as Ethereum. This widens the scope of applications to anything that can be described in machine language. As blockchain technology begins to apply in various industries, the technology also faces challenges in the conditions and requirements in those industries. Moreover, the permissionless and anonymous nature of blockchains could potentially bring various compliance and technical challenges when blockchain is applied to certain industries. Oftentimes blockchains are built without the intrinsic ability to adhere to certain requirements that are specific to an application, especially relating to whom has the agency to interact with any resource on the blockchain and the precise manner in which they are allowed to interact with it.

SUMMARY

Embodiments relate to a computer-implemented method, including: causing a gated autonomous program protocol to be stored on a blockchain, wherein the gated autonomous program protocol is configured to exchange a blockchain unit with a gated wrapped blockchain unit that is exchangeable among blockchain addresses that satisfy one or more gating requirements; verifying that an account associated with a particular blockchain address of the blockchain satisfies the one or more gating requirements; and causing an issuance of an on-chain verification proof to the particular blockchain address, the on-chain verification proof being stored on the blockchain as an on-chain representation that the particular blockchain address is verified with the one or more gating requirements, wherein the gated autonomous program protocol is configured to verify the on-chain verification proof before approving a transaction request associated with the gated wrapped blockchain unit that is initiated by the particular blockchain address.

In some embodiments, the gated autonomous program protocol includes instructions, the instructions, when executed, cause one or more processors to: receive the transaction request from the particular blockchain address requesting to exchange a quantity of the blockchain unit with the quantity of gated wrapped blockchain unit; verify that the particular blockchain address is associated with the on-chain verification proof; hold the quantity of the blockchain unit in custody; and issue the quantity of the gated wrapped blockchain unit to the particular blockchain address.

In some embodiments, one or more gating requirements are specified by an issuer and the account is maintained by the issuer.

In some embodiments, verifying that the account associated with the particular blockchain address satisfies one or more gating requirements includes: receiving, from the issuer, a list of accounts that are maintained by the issuer; determining that the account associated with the particular blockchain address is within the list; and determining that the account automatically satisfies the one or more gating requirements.

In some embodiments, one or more gating requirements are verified off-chain.

In some embodiments, the on-chain verification proof is issued by a second autonomous program protocol which includes instructions, wherein the instructions, when executed, cause one or more processors: communicate with an oracle machine that verifies that the account satisfies one or more gating requirements; receive the particular blockchain address associated with the account; and issue the on-chain verification proof to the particular blockchain address.

In some embodiments, one or more gating requirements are verified by an oracle machine, and one or more gating requirements are adjustable.

In some embodiments, the oracle machine is in communications with a plurality of autonomous program protocols that are stored one or more blockchains, the plurality of autonomous program protocols are configured to issue on-chain verification proofs with respect to different types of gated wrapped blockchain units.

In some embodiments, the different types of gated wrapped blockchain units are associated with the same gating requirements that are verified by the oracle machine.

In some embodiments, causing an issuance of the on-chain verification proof includes causing a non-fungible token to be specifically issued to the particular blockchain address, the non-fungible token being at least part of the on-chain verification proof.

In some embodiments, the gated wrapped blockchain unit is exchanged through the gated autonomous program protocol.

In some embodiments, the transaction request is a transfer request, wherein the gated autonomous program protocol includes instructions, the instructions, when executed, cause one or more processors to: receive a transfer request from the particular blockchain address to transfer a quantity of the gated wrapped blockchain unit to a second blockchain address; verify that the particular blockchain address is associated with the on-chain verification proof; and generating a ledger to be recorded to the blockchain that reflects the quantity of the gated wrapped blockchain unit is transferred from the particular blockchain address to the second blockchain address.

In some embodiments, the techniques described herein relate to a system. The system includes a verification autonomous program protocol that is stored on a blockchain, the verification autonomous program protocol including a first set of instructions, the instructions, when executed, cause one or more first processors to: receive a verification that an account associated with a particular blockchain address of the blockchain satisfies one or more gating requirements; and issue an on-chain verification proof to the particular blockchain address, the on-chain verification proof being stored on the blockchain as an on-chain representation that the particular blockchain address is verified with the one or more gating requirements. The system also includes a gated autonomous program protocol that is stored on the blockchain, the gated autonomous program protocol including a second set of instructions, the instructions, when executed, cause one or more second processors to: exchange a blockchain unit with a gated wrapped blockchain unit that is exchangeable among blockchain addresses that satisfy the one or more gating requirements; receive a transaction request associated with the gated wrapped blockchain, the transaction request initiated by the particular blockchain address; verify the on-chain verification proof associated with the particular blockchain address; and approve the transaction request.

In some embodiments, the system further includes an oracle machine in communication with the verification autonomous program protocol, wherein the oracle machine is configured to perform the verification that the account satisfies the one or more gating requirements.

In some embodiments, the oracle machine is in communications with a plurality of autonomous program protocols that are stored one or more blockchains, the plurality of autonomous program protocols are configured to issue on-chain verification proofs with respect to different types of gated wrapped blockchain units.

In some embodiments, the first set of instructions that causes issuing of the on-chain verification proof includes instructions to cause a non-fungible token to be specifically issued to the particular blockchain address, the non-fungible token being at least part of the on-chain verification proof.

In some embodiments, the techniques described herein relate to one or more non-transitory computer-readable media configured to store a gated autonomous program protocol that operates on a blockchain, the gated autonomous program protocol including instructions, wherein the instructions, when executed by one or more processors, cause the one or more processors to: exchange a blockchain unit with a gated wrapped blockchain unit that is exchangeable among blockchain addresses that satisfy one or more gating requirements; receive a transaction request associated with the gated wrapped blockchain, the transaction request initiated by a particular blockchain address; verify an on-chain verification proof associated with the particular blockchain address, wherein the on-chain verification proof is issued to the particular blockchain address and is stored on the blockchain as an on-chain representation that the particular blockchain address is verified with the one or more gating requirements; and approve the transaction request.

In some embodiments, the instructions, when executed, further cause the one or more processors to: receive transaction request from the particular blockchain address requesting to exchange a quantity of the blockchain unit with the quantity of gated wrapped blockchain unit; hold the quantity of the blockchain unit in custody; and issue the quantity of the gated wrapped blockchain unit to the particular blockchain address.

In some embodiments, the instructions, when executed, further cause the one or more processors to: receive transfer request from the particular blockchain address to transfer a quantity of the gated wrapped blockchain unit to a second blockchain address; generating a ledger to be recorded to the blockchain that reflects the quantity of the gated wrapped blockchain unit is transferred from the particular blockchain address to the second blockchain address.

In some embodiments, the on-chain verification proof includes a non-fungible token to be specifically issued to the particular blockchain address, the non-fungible token being at least part of the on-chain verification proof.

The figures depict, and the detail description describes, various non-limiting embodiments for purposes of illustration only.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
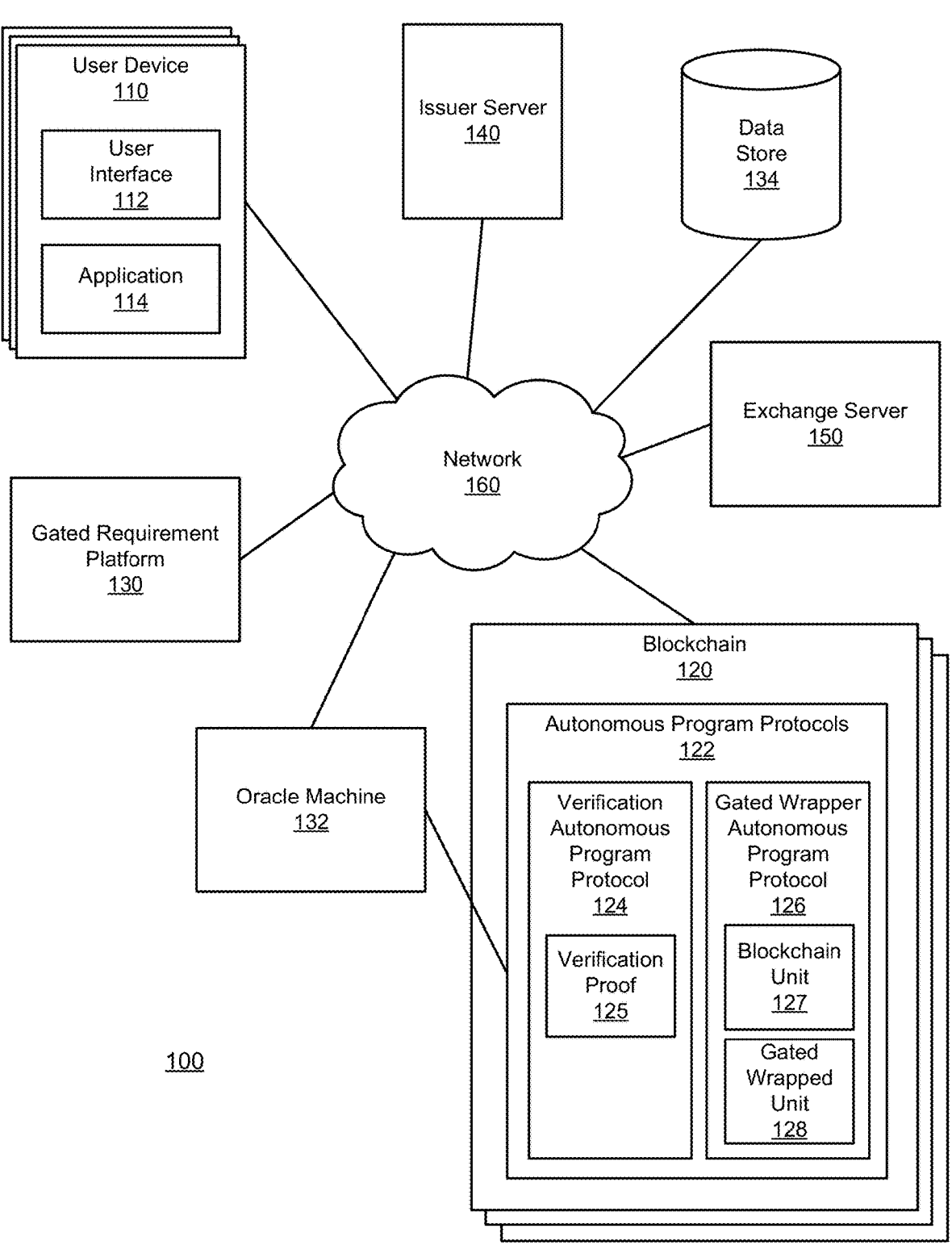
(FIG. 1 is a block diagram that illustrates a system environment of an example computing server, in accordance with some embodiments.

FIG. (FIG. 1 is a block diagram that illustrates a system environment 100 of operating gated wrapper blockchain units, in accordance with some embodiments. By way of example, the system environment 100 includes a user device 110, a blockchain 120, a gating requirement platform 130, a data store 134, an issuer server 140, an exchange server 150 and different types of autonomous program protocols 122. The entities and components in the system environment 100 communicate with each other through the network 160. In various embodiments, the system environment 100 may include different, fewer, or additional components. The components in the blockchain system environment 100 may each correspond to a separate and independent entity or may be controlled by the same entity. For example, in some embodiments, the gating requirement platform 130 may set requirements for the oracle machine 132 and control the data store 134.

While each of the components in the system environment 100 is often described in disclosure in a singular form or plural form, the system environment 100 may include one or more of each of the components. For example, there can be multiple user devices 110 communicating with the issuer server 140 and the blockchain 120. Also, the gating requirement platform 130 may provide service for multiple issuer servers 140, each of whom has multiple end users that may operate different user devices 110. While a component is described in a singular form in this disclosure, it should be understood that in various embodiments the component may have multiple instances. Likewise, even if a component is frequently described in plural, there can be embodiments where only one instance of the component exists in the system environment 100. Hence, in the system environment 100, there can be one or more of each of the components.

A user device may also be referred to as a client device. A user device 110 may be controlled by a user who may be the customers or users of the issuer server 140, the gating requirement platform 130, and/or a participant of the blockchain 120. In some situations, a user may also be referred to as an end user, for example, when the user is the issuer server's customer who uses applications that are published by the issuer server 140. The user device 110 may be any computing device. Examples of user devices 110 include personal computers (PC), desktop computers, laptop computers, tablet computers, smartphones, wearable electronic devices such as smartwatches, or any other suitable electronic devices.

The user device 110 may include a user interface 112 and an application 114. The user interface 112 may be the interface (e.g., frontend interface, application programming interface (API), etc.) of the application 114 and allow the user to perform various actions associated with application 114. In one example, an application 114 may be a software application that allows the user device 110, which is in possession of a blockchain wallet private key, to interact with the blockchain 120. In another example, an application 114 may be a software application published by the issuer server 140 that allows users to use various services provided by the issuer server 140. In yet another example, an application 114 may be a portal that has access to the blockchains 120 to allow users to exchange various blockchain units with other users. In some embodiment, an application 114 is a software application that can be downloaded and installed on a user device 110 via, for example, an application store (App store) of the user device 110. The possession of a blockchain wallet private may be through different forms. For example, in one case, the private key may be stored in the memory of a user device 110 that is possessed by the user. In another case, the private key may be stored in pieces in a distributed manner through techniques such as multi-party computation (MPC). In any case, regardless of the manner of storage of the private key, it is considered that a user device 110 is in possession of the private key.

The user interface 112 may take different forms. In some embodiments, the user interface 112 is a software application interface. In some embodiments, the front-end software application may take the form of a webpage interface that allows users to perform actions through web browsers. The front-end software application includes a graphical user interface (GUI) that displays various information and graphical elements. In some embodiments, user interface 112 does not include graphical elements but communicates with the issuer server 140 via other suitable ways such as command windows or application program interfaces (APIs).

A blockchain 120 may be a public blockchain that is decentralized, a private blockchain, a semi-public blockchain, an execution layer settling data on a public blockchain (e.g., Layer 2 blockchains, rollups), or an application-specific chain. A public blockchain network includes a plurality of nodes that cooperate to verify transactions and generate new blocks. In some implementations of a blockchain, the generation of a new block may also be referred to as a proposal process, which may be a mining process or a validation process. A blockchain 120 may be a new blockchain or an existing blockchain such as BITCOIN, ETHEREUM, EOS, NEAR, SOLANA, AVALANCHE, etc. The system environment 100 may include one or more blockchains 120. In some embodiments, the process described in this disclosure may allow cross-chain communications. In other embodiments, the on-chain processes described in this disclosure are conducted with a single blockchain 120. A blockchain 120 includes a plurality of nodes. Each node may include one or more processors. The processors in various nodes may independently or cooperatively execute various blockchain processes such as generating blocks, reaching consensus, and executing code instructions that are stored on the blockchain 120.

Some of the blockchains 120 support autonomous program protocol 122, which is a set of code instructions that are stored on a blockchain 120 and are executable when one or more conditions are met. The autonomous program protocols 122 may be tokens, smart contracts, Web3 applications, autonomous applications, distributed applications, decentralized finance (DeFi) applications, protocols for decentralized autonomous organizations (DAO), non-fungible tokens (NFT), decentralized exchanges, identity services, blockchain gaming, metaverse protocols, and other suitable protocols and algorithms that may be recorded on a blockchain. Smart contracts may be examples of autonomous program protocols 122 that may be executable by a computer such as a virtual machine of the blockchain 120. Here, a computer may be a single operation unit in a conventional sense (e.g., a single personal computer) or may be a set of distributed computing devices that cooperate to execute the code instructions (e.g., a virtual machine or a distributed computing system). An autonomous program protocol 122 includes a set of instructions. The instructions, when executed by one or more processors, cause the one or more processors to perform steps specified in the instructions. The one or more processors may correspond to a node of the blockchain 120 or may be distributed among various nodes of the blockchain 120.

On a blockchain 120, there can be various types of autonomous program protocols 122. For example, in some embodiments, the autonomous program protocol 122 may include a verification autonomous program protocol 124 and a gated wrapper autonomous program protocol 126. Other types of autonomous program protocols 122 are also possible in various Web3 application settings. In some embodiments, an autonomous program protocol 122 may store and may point to a location of a public key of an administrator of the autonomous program protocol 122. The administrator may possess the private key and use the private key to generate a digital signature that is verifiable by the public key known to the autonomous program protocol 122. As such, the administrator may manage the autonomous program protocol 122 for certain things such as version changes, code updates, etc.

A verification autonomous program protocol 124 may include instructions that determine whether an account associated with a blockchain address satisfies one or more gating requirements and, if so, issue an on-chain verification proof 125 to the blockchain address. An account may be a record of information that uniquely identifies an individual or entity. The on-chain verification proof 125 may be stored on the blockchain, for example, within the ledgers of the blockchain address associated with the verification autonomous program protocol 124. The on-chain verification proof 125 may serve as an on-chain representation that a particular blockchain address is verified with the one or more gating requirements.

A verification proof 125 may take various forms. For example, a verification proof 125 may be a unique identifier associated with a blockchain address. In some embodiments, a verification proof 125 may be a soulbound non-fungible token that is stored in a ledger of the verification autonomous program protocol 124. The soulbound NFT is non-transferable. For example, the verification autonomous program protocol 124 may issue unique soulbound NFTs to different blockchain addresses whose corresponding accounts are verified with the gating requirements. The verification autonomous program protocol 124 may list the soulbound NFTs in a ledger at the blockchain address associated with the verification autonomous program protocol 124 such that another autonomous program protocol 122 may check what blockchain addresses have the verification proofs 125. In some embodiments, a verification proof 125 may take the form of an NFT that is transferrable. However, only the verification autonomous program protocol 124 may conduct the transfer by verifying the recipient blockchain address is also associated with an account that satisfies the gating requirement. In some embodiments, a verification proof 125 may just be a ledger that lists a collection of blockchain addresses that have corresponding accounts that satisfy the gating requirements. A verification proof 125 may be a discrete blockchain unit or generic ledger entry specific to an individual or group of recipient blockchain addresses, be it a tokenized or non-token representation.

A gated wrapper autonomous program protocol 126 may include instructions that allow blockchain addresses that are verified to satisfy one or more gating requirements to exchange gated wrapped blockchain units 128. In some embodiments, the gated wrapper autonomous program protocol 126 may only allow blockchain addresses with the verification proof 125 to initiate transaction requests associated with a gated wrapped blockchain unit 128. For example, the gated wrapper autonomous program protocol 126 may receive a transfer request from a first blockchain address to transfer a quantity of the gated wrapped blockchain units 128 to a second blockchain address. The gated wrapper autonomous program protocol 126 may verify that the first blockchain address is associated with an on-chain verification proof 125. In response, the gated wrapper autonomous program protocol 126 may generate a ledger to be recorded to the blockchain 120 that reflects the quantity of the gated wrapped blockchain unit 128 transferred from the first blockchain address to the second blockchain address.

Figure 2:
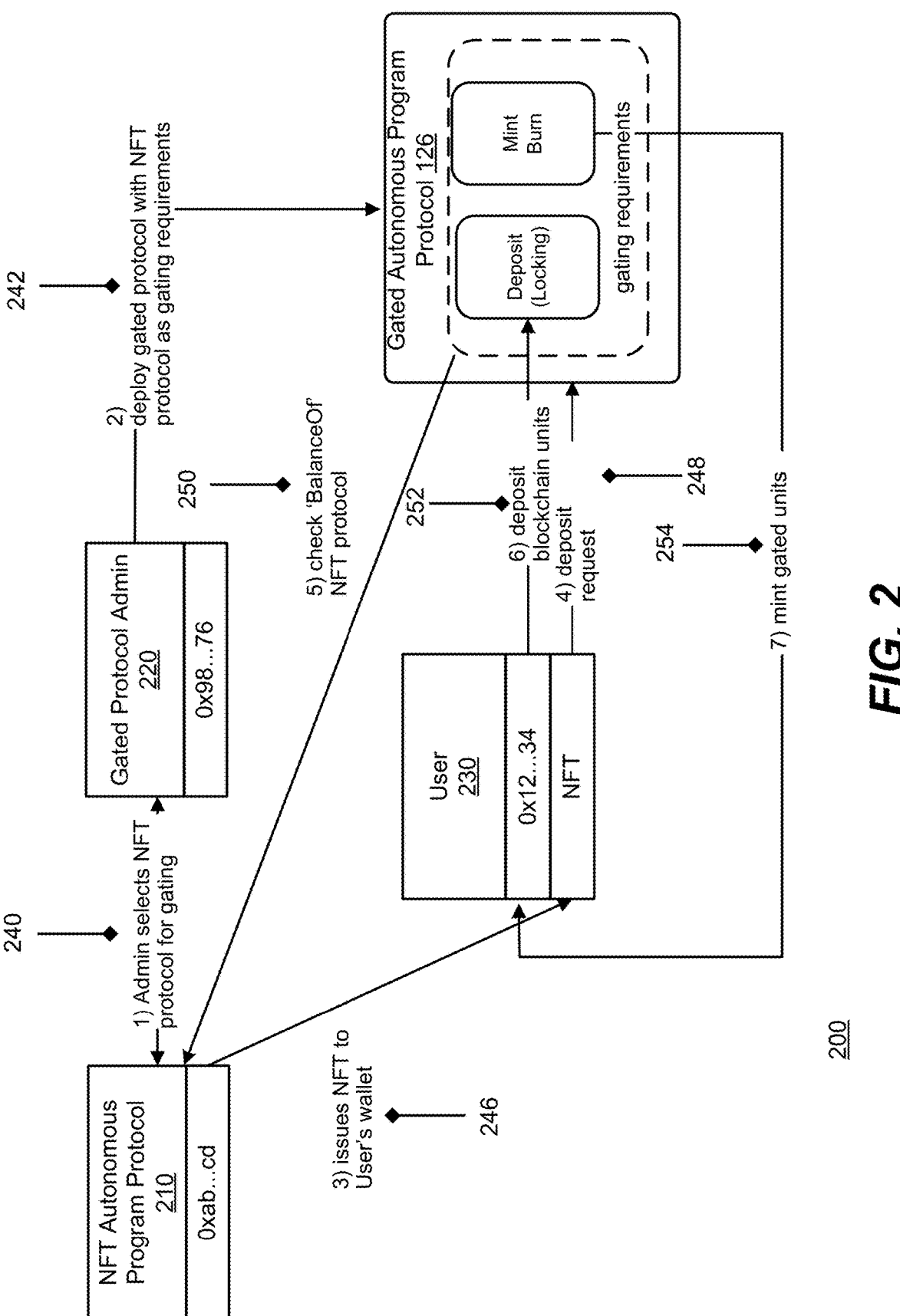
FIG. 2 is a block diagram depicting an example blockchain unit wrapping process, in accordance with some embodiments.

While a gated wrapper autonomous program protocol 126 is often referred to in singularity in this disclosure, each gated wrapper autonomous program protocol 126 may include one or more protocols that cooperate together or may be a single protocol that carries out the functionalities. For example, FIG. 2 illustrates that a gated wrapper autonomous program protocol 126 includes various functionalities such as mint, burn, deposit, and verification. In some embodiments, the gated wrapper autonomous program protocol 126 may take the form of a single smart contract that has different algorithmic functions to carry out those functionalities. In other embodiments, the functionalities may be divided into one or more smart contracts. Those smart contracts may collectively be part of the gated wrapper autonomous program protocol 126.

A gated wrapper autonomous program protocol 126 may be a type of token wrapper contract, which is a smart contract with executable programs running on blockchain virtual machines that lock up specific tokens and create, or mint, a new token type with new properties. The token wrapper contract may store tokens that the blockchain address owner has redeemed for its wrapped counterpart. The wrapper contract may mint new wrapped tokens to the holder's blockchain address according to a predetermined rule set specified in the gated wrapper autonomous program protocol 126. The blockchain address owner, or any other future owner of the wrapped token, can return the wrapped tokens to the gated wrapper autonomous program protocol 126 by having the wrapper contract to burn the wrapped token in exchange of the deposited token counterpart. By returning the wrapped tokens to the gated wrapper autonomous program protocol 126, the wrapped token owner can redeem the original tokens in exchange for the wrapped tokens according to the rule set. In some embodiments, the gated wrapped blockchain units 128 inherit properties from the original blockchain units 127. In addition, the gated wrapped blockchain units may often introduce novel functions or extend the current functions of the original blockchain units 127.

In various embodiments, a gated wrapper autonomous program protocol 126 may be used for a single type of blockchain unit 127 or multiple different types of blockchain units 127, depending on implementations. For example, in some embodiments, a gated wrapper autonomous program protocol 126 may be able to mint different wrapped tokens for different types of blockchain units 127 that are native on a blockchain 120.

In some embodiments, wrapped tokens may refer to a token that is held in a known location, such as the ledger of the gated wrapper autonomous program protocol 126 as collateral, and the wrapper is used as representative ownership of the underlying token that is held as collateral. A blockchain wrapper contract, which is an example of a gated wrapper autonomous program protocol 126, may be configured to access and lock approved blockchain tokens and create new blockchain tokens with new functionality embedded in the token's program. The wrapped tokens pattern can be applied to introduce custom functionality to an existing token.

In some embodiments, wrapped tokens may be associated with a mechanism where the blockchain address owner wraps an existing token into a new wrapped token with additional functionalities. The translation between tokens and wrapped tokens can be reversible. Users can redeem the wrapper for the underlying token or generate wrapped tokens by providing the requisite token from which it is created. By way of example, a native token of the Ethereum blockchain, ETHER, may be locked into a wrapper contract in return for wrapped Ether, an equivalent token that conforms to prevalent industry standards, allowing it to be used in contexts where ETHER is not easily supported. Wrapped Ether can be redeemed for ETHER and vice versa.

Gated wrapper autonomous program protocols 126 are a subset of wrapper program protocols. The gated wrapper autonomous program protocol 126 may be associated with requirements governing who has the agency to interact with the gated wrapper autonomous program protocol 126 and the precise manner of interaction. A gated wrapper autonomous program protocol 126 may require a specific or a variation of blockchain resources, such as the verification proof 125, at the time of interaction to call for the program protocol's functionality successfully. Blockchain addresses that do not meet the requirements will fail to interact with the gated wrapper autonomous program protocol 126, preventing unintended, unwanted, or prohibited use. The requirements may be referred to as gating requirements and are discussed in further detail below.

The gated wrapper autonomous program protocol 126 may also convert a blockchain unit 127 to a gated wrapped blockchain unit 128. The gated wrapper autonomous program protocol 126 may receive a deposit request that exchanges the blockchain unit 127 with the gated wrapped blockchain unit 128. For example, the gated wrapper autonomous program protocol 126 may receive a request to exchange a quantity of the blockchain unit 127 with the same quantity of gated wrapped blockchain unit 128. The gated wrapper autonomous program protocol 126 may verify that the blockchain address that initiated the exchange request is associated with a verification proof 125. The gated wrapper autonomous program protocol 126 may hold the quantity of the blockchain unit 127 in custody and issue the quantity of the gated wrapped blockchain unit 128 to the blockchain address.

A gated wrapper autonomous program protocol 126 may include various sub-functions that perform different interactions. A gated wrapper autonomous program protocol 126 may include different functionalities based on different gating requirements. Variable requirements can introduce different restrictions or functionalities. For example, the gated wrapper autonomous program protocol 126 may include one or more interaction-specific functions. In some embodiments, a gated wrapper autonomous program protocol 126 may include functionalities to wrap and/or combine blockchain units 127 to generate gated wrapped blockchain units 128. Through the wrapping, the gated wrapper autonomous program protocol 126 may extend or remove functionalities in the original blockchain unit 127. For example, the gated wrapper autonomous program protocol 126 may introduce new mechanisms that are required to interact with the blockchain unit 127 which is now in the form of gated wrapped blockchain unit 128.

In some embodiments, the functions of the gated wrapper autonomous program protocol 126 may also include freezing gated wrapped blockchain units 128. For example, an administrator of the gated wrapper autonomous program protocol 126 may cause the gated wrapper autonomous program protocol 126 to freeze or lock a gated wrapped blockchain unit 128. To prevent misuse, a gated wrapped blockchain unit 128 that is frozen may be stopped from being wrapped, unwrapped, or interacting with. Freezing requirements may be part of the gating requirements or can be executed using the administrator's private keys. Misuse or abuse of the gated wrapper autonomous program protocol 126 or the gated wrapped blockchain units 128, regardless of intent, can trigger freezing.

In some embodiments, the functions of the gated wrapper autonomous program protocol 126 may also include timed requirements on gated wrapped blockchain units 128. A blockchain address that does not meet the gating requirements cannot interact with the gated wrapped blockchain units 128, even for the gated wrapped blockchain units 128 that somehow end up at the blockchain address. As such, the transfer of gated wrapped blockchain units 128 to such a blockchain address can create transactions that are forever in an unfinalized state. To avoid this type of unused blockchain units, the gating requirements can include a time frame or block height for transacted gated wrapped blockchain units 128. In case the time requirements have not been met, the state or function of these gated wrapped blockchain units 128 can change. This change of state or function can include but is not limited to burning, freezing, or making ineligible transactions, returning to the sender's blockchain address, re-minting to the sender's blockchain address, or another type of state or function change.

In some embodiments, the functions of the gated wrapper autonomous program protocol 126 may also include identity verification, although in other cases identity verification may be performed by other components in the system environment 100, such as by the gated requirement platform 130 or the issuer server 140. Identity verification ensures that users, customers, or counterparties provide information associated with a legal person's identity and confirms the legal status of the legal person. Identity verification may take the form of an authentication process that compares the identity a legal person claims to possess with data that proves it. There are many documents that can serve as providers of this objective truth that can include but are not limited to birth certificates, social security cards, driver licenses, funding documents, registration documents, tax-related documents, contracts, addresses, and others.

Identity verification measures may include but are not limited to Know Your Customer (KYC), Know Your Business (KYB), Accredited Investor Verification, Anti-Money Laundering (AML) processes, bank account verification, and other regulatory and compliance requirements and efforts to assess and monitor risk. The process may be done in person or electronically. In some embodiments, the identity verification processes may include continuous monitoring of the identified legal person to continuously monitor legal standing.

Blockchain units 127 may be any blockchain resources such as cryptocurrency, coins, or tokens that are generated and/or exchanged on a blockchain 120, such as BITCOIN, ETHER, TETHER, BINANCE COIN, US DOLLAR COIN, XRP, CARDANO, DOGECOIN, SOLANA, LITECOIN, etc., and verifiable credentials that are signed into the blockchain 120 by a wallet or on behalf of a wallet. Blockchain resources may also include but are not limited to tokens, non-fungible tokens, fungible tokens, soulbound tokens, wrapped tokens, signed tokens, vault tokens, pool tokens, smart contracts, non-standard format on-chain available data or functions, nonstandard format on-chain discoverable data or functions and any variations of them. Blockchain resources can include but are not limited to on-chain available resources that refer to a blockchain address or a resource that is owned or controlled by a blockchain address. Other example units may include any fungible tokens that comply with the ERC-20 standard and non-fungible tokens such as those generated under ERC-721 standard. Each quantity of the gated wrapped blockchain unit 128 may represent the same quantity of the blockchain unit 127. For example, an ETHER may be converted to a gated wrapped ETHER. The gated wrapper autonomous program protocol 126 may hold the unit of ETHER in custody at the blockchain address of the gated wrapper autonomous program protocol 126 and generates the unit of gated wrapped ETHER. The exchange of gated wrapped blockchain units 128 represents transactions that are in compliance with the gating requirements.

The gated wrapped blockchain units 128 can inherit the gating requirements from the gated wrapper autonomous program protocol 126 or can introduce novel requirements. A blockchain address that does not meet the requirements of the gated wrapped blockchain units 128 will fail to initiate a transaction or interact with the gated wrapped blockchain units 128. Gating prevents unintended, unwanted, or prohibited use of the gated wrapped blockchain units 128. In some embodiments, a first blockchain address that does not meet the requirements of the gated wrapped blockchain units 128 can receive gated wrapped blockchain units 128 from a second blockchain address that meets the requirements, but the first blockchain address cannot initiate any transactions related to the gated wrapped blockchain units 128.

One or more autonomous program protocols 122 may be in communication with oracle machines 132. An oracle machine 132 provides secure and reliable access to off-chain data and events for an autonomous program protocol 122 that is in communication with the oracle machine 132. The oracle machine 132 may bring real-world data into the blockchain 120 and enable an autonomous program protocol 122 to interact with external systems, such as APIs. An oracle machine may be decentralized. The decentralized nature allows the security and reliability of the data by eliminating the need for a central authority and enabling multiple oracles to reach a consensus on the validity of the data.

A gating requirement platform 130 may be an off-chain platform that provides various access control and compliance services to enable the verification of the gating requirements of the gated wrapper autonomous program protocol 126. The gating requirement platform 130 may allow a party to specify one or more gating requirements in order for an account to be able to carry out transactions at the gated wrapper autonomous program protocol 126. The party that specifics the gating requirements may be an issuer server 140. The gating requirement platform 130 may provide an online platform, such as software-as-a-service (SaaS) platform for an issuer to specify the gating requirements. The gating requirement platform 130 may be in communication or in control of the specification of an oracle machine 132 that provides data to the verification autonomous program protocol 124. The gating requirement platform 130 may adjust the specification of the oracle machine 132 to reflect the gating requirements. The issuer, through the gating requirement platform 130, may adjust the gating requirements and the gating requirement platform 130 may in turn adjust the oracle machine 132.

In some embodiments, the gating requirement platform 130 may be partially centralized and partially decentralized. For example, certain gating requirements may be specified by an issuer server 140 and centrally enforced by the gating requirement platform 130. In some embodiments, the gating requirement platform 130 may operate an oracle machine 132 and a verification autonomous program protocol 124 that are decentralized. In some embodiments, the gating requirement platform 130 may be the publisher of the gated wrapper autonomous program protocol 126. The gating requirement platform 130 may cause the gated wrapper autonomous program protocol 126 to be stored on the autonomous program protocol 122 by publishing the gated wrapper autonomous program protocol 126. The gating requirement platform 130 may also be the administrator of the gated wrapper autonomous program protocol 126. In some embodiments, the gating requirement platform 130 may include a decentralized autonomous organization.

In some embodiments, the gating requirement platform 130 may verify an account associated with a blockchain address of the blockchain 120 satisfies one or more gating requirements. The verification may be performed by an oracle machine 132 or directly in a centralized manner by the gating requirement platform 130. In turn, the gating requirement platform 130 may cause an issuance of an on-chain verification proof 125 to the blockchain address. For example, the gating requirement platform 130 may cause an oracle machine 132 to supply the blockchain address and the verification record to the verification autonomous program protocol 124 to cause the verification autonomous program protocol 124 to issue the verification proof 125 to the blockchain address. In some embodiments, the gating requirement platform 130 may have a direct control such as a private key to directly cause the verification autonomous program protocol 124 to issue the verification proof 125 to the blockchain address.

In some embodiments, the gating requirement platform 130 may control the configuration of a number of oracle machines 132 that are in communications with a plurality of autonomous program protocols 122 that are stored in one or more blockchains 120. The plurality of autonomous program protocols 122 may be configured to issue on-chain verification proofs with respect to different types of gated wrapped blockchain units 128. Under this configuration, the same or similar types of gating requirements may be used for different blockchain units 127 that are exchanged on various blockchains 120. An issuer server 140 may specify the gating requirements and the gating requirement platform 130 may configure the oracle machine 132 so that different gated wrapped blockchain units 128 are subject to the same gating requirements.

Gating requirements may take different forms and are of various natures for different purposes such as compliance, access control, identity verification, etc. In some embodiments, gating requirements may specify who has the agency to interact with a blockchain unit on the blockchain 120 and the precise manner of interaction. Alternatively, or additionally, gating requirements may include discoverable blockchain resources on the blockchain network. Alternatively, or additionally, gating requirements may be related to a blockchain address's interaction with an autonomous program protocol 122. For example, gating requirements may include the transaction history of the blockchain address, the transaction history of certain tokens or a variation of tokens owned and controlled by the blockchain address, the history of the token required for locking in the contract, verification for on-chain fraud or sanctions transactions or historical activity such as hacks, exploits, sanction lists. Alternatively, or additionally, gating requirements may also be related to the blockchain address receiving gated wrapped blockchain units 128. For example, gating requirements may include the transaction history of the blockchain address, the transaction history of certain tokens or a variation of tokens owned and controlled by the blockchain address, the history of the token required for locking in a gated wrapper autonomous program protocol 126, verification for on-chain fraud or sanctions transactions or historical activity such as hacks, exploits, and sanction lists. Alternatively, or additionally, gating requirements may include changes in the usage behavior of a blockchain address. Alternatively, or additionally, gating requirements may be token-related and include a subset of tokens owned or controlled by the blockchain address interacting with a gated wrapper autonomous program protocol 126 to prevent tainted tokens from being locked up.

In some embodiments, gating requirements may also include but are not necessarily limited to resources that can express validity or expiry status of the verification, verification methods used to verify the blockchain address' owner (KYC, KYB, Investor Accreditation, etc.), rate limiting mechanisms, types of legal persons the verification relates to, relationships between blockchain addresses, history of transactions of the blockchain address, transaction history of blockchain units held or controlled by the blockchain address, audit-related information, Anti Money Laundering related information, any personal identifiable information related to the legal person, data linked directly or indirectly to the resource in an off-chain data set, information about the verification issuer.

In some embodiments, gating requirements may include both on-chain requirements and off-chain requirements. For example, various identity and activity verification requirements may be used to verify a user off-chain. The association of the verification proof 125 with the blockchain address corresponding to the user may also be a gating requirement that is verified on-chain. The verification proof 125 may serve as a representation that one or more off-chain gating requirements are satisfied but may also serve as an additional safeguard on top of any verifications done off-chain. The gated wrapper autonomous program protocol 126 may be associated with one or more gating requirements, on-chain and/or off-chain before the gated wrapper autonomous program protocol 126 may be used.

In some embodiments, gating requirements may rely on non-blockchain native resources. Blockchain networks are closed databases. Interacting with blockchain resources on these closed networks is limited and may interrupt resources available on the network. To introduce non-network native or off-chain resources that can be part of the gating requirements, the blockchain address holder may make these off-chain resources available as native resources on the network. To publish off-chain data as a blockchain resource, the process used may include the use of an oracle machine 132. For example, verifiable credentials may be published to the blockchain 120 as a proof for the satisfaction of a gating requirement.

The data store 134 includes one or more storage units such as memory that takes the form of non-transitory and non-volatile computer storage medium to store various data. The computer-readable storage medium is a medium that does not include a transitory medium such as a propagating signal or a carrier wave. The data store 134 may be used by the gating requirement platform 130 to store data related to the gating requirement platform 130, such as various gating requirements. In some embodiments, the data store 134 communicates with other components by the network 160. This type of data store 134 may be referred to as a cloud storage server. Example cloud storage service providers may include AMAZON AWS, DROPBOX, RACKSPACE CLOUD FILES, AZURE BLOB STORAGE, GOOGLE CLOUD STORAGE, etc. In another embodiment, instead of a cloud storage server, the data store 134 is a storage device that is controlled and connected to the gating requirement platform 130. For example, the data store 134 may take the form of memory (e.g., hard drives, flash memory, discs, ROMs, etc.) used by the gating requirement platform 130 such as storage devices in a storage server room that is operated by the gating requirement platform 130.

An issuer server 140 may be operated by an organization, such as a business, a government agency, a compliance agency and/or a software company. The issuer server 140 may specify one or more gating requirements. The issuer may include end users that control the user devices 110. In some embodiments, a gating requirement may be that holders of accounts maintained by the issuer automatically satisfy all gating requirements and can carry transactions via the gated wrapper autonomous program protocol 126. In such a case, the issuer server 140 may provide a list of accounts that are maintained by the issuer server 140 to the gating requirement platform 130. The list of accounts corresponds to a list blockchain addresses. In turn, the gating requirement platform 130 determines that those accounts automatically satisfy the gating requirements and causes the verification autonomous program protocol 124 to generate verification proofs 125 to those blockchain addresses. For example, the issuer server 140 may specify that all users of the issuer server 140, but not non-users, are allowed to trade gated wrapped blockchain units 128 associated with the issuer server 140 by using the gating mechanisms described in this disclosure.

In some embodiments, an issuer server 140 may be a trusted source such as a compliance authority and the verification of gating requirements may be conducted by the issuer server 140. In turn, the issuer server 140 may provide a list of accounts or blockchain addresses that are in compliance. The verification autonomous program protocol 124 generates the verification proofs 125 to those blockchain addresses.

An exchange server 150 may be a server that allows users to exchange various blockchain units such as blockchain units 127 and gated wrapped blockchain units 128. The exchange server 150 may be a centralized exchange server. In some embodiments, the exchange server 150 may provide an interface that allows different users to perform transactions. In some embodiments, the exchange server 150 may store the private cryptographic keys corresponding to blockchain addresses on behalf of the users. In turn, the users of the exchange server 150 may exchange blockchain units 127 and gated wrapped blockchain units 128 through the exchange server 150. For example, the exchange server 150 may broadcast transactions on behalf of the users on the blockchain 120 using the private keys stored in the exchange server 150.

While the operations of a gated wrapper autonomous program protocol 126 is generally decentralized, the publication and administration of the gated wrapper autonomous program protocol 126 may be performed by an administrator of the gated wrapper autonomous program protocol 126. For example, the requirements for interaction are set by the administrator of the gated wrapper autonomous program protocol 126. Depending on the embodiments and implementations, the administrator may be gating requirement platform 130, the issuer server 140, or the exchange server 150. For example, in one embodiment, the gating requirement platform 130 may be the administrator of the gated wrapper autonomous program protocol 126 and provides gating and compliance services to various issuers. In some embodiments, different functions in the gated wrapper autonomous program protocol 126 can have different administrators. An administrator is the private key holder with the right to administer the gated wrapper autonomous program protocol 126 or a function in the gated wrapper autonomous program protocol 126. The key can be a single private key, a private key linked to a multi-signature wallet, a private key held by MPC wallet or MPC mechanism, or another suitable way of handling private key. Gating requirements enforced by the gated wrapper autonomous program protocol 126 can be set at the time of deployment of the gated wrapper autonomous program protocol 126 or updated by the administrator after the deployment of the gated wrapper autonomous program protocol 126.

In some embodiments, the gated wrapper autonomous program protocol 126 may be associated with applicable fees that may be transferred to a beneficiary's blockchain address. The beneficiary may be the administrator or any party that is specified by the terms in the gated wrapper autonomous program protocol 126. Fees can be introduced by the administrator as part of the gating requirements. For example, when a blockchain unit 127 is exchanged to a gated wrapped blockchain unit 128 and the blockchain unit 127 is locked in the ledger of the gated wrapper autonomous program protocol 126, a fee may be assessed. Fees may also be assessed when the gated wrapped blockchain units 128 are exchanged by the gated wrapper autonomous program protocol 126 or by another component, such as an exchange server. Fees may be assessed at the time of wrapping or locking, the time of unwrapping or unlocking, the time of transactions, at the time of any interaction with the gated wrapped contract or token, and/or any variation or combination of these situations. These are merely examples of situations where fees may be assessed, but in some embodiments many of those situations are free. Fees may also take various forms, such as occurring as a one-time fee, occurring with each transaction, occurring as a continuous or streamed fee, occurring at set intervals or at certain predetermined times, or on a random basis. In various embodiments, fees may be calculated at a fixed rate or as a percentage of the transaction amount or based on other variables, differ based on other requirements, and vary for each token or token type. In various embodiments, fees may be constant, change over time, change based on the number or the volume of transactions, or change based on other variables.

The communications among various components in the system environment 100 may be transmitted via a network 160, for example, via the Internet. In some embodiments, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 160 also includes links and packet switching networks such as the Internet.

Example Wrapping Processes

FIG. 2 is a block diagram depicting an example blockchain unit wrapping process 200, in accordance with some embodiments. The wrapping process 200 illustrates an example gated wrapper autonomous program protocol 126 that uses NFTs as permission for interactions. The NFT autonomous program protocol 210 may be an example of the verification autonomous program protocol 124. The NFT autonomous program protocol 210 may issue an on-chain verification proof 125 in the form of NFT to a specific blockchain address to serve as a representation that the blockchain address is verified with one or more gating requirements.

In some embodiments, the blockchain unit wrapping process 200 uses various functionalities to limit interaction and verify gating requirements. By way of example, the blockchain unit wrapping process 200 may implement the gated wrapper autonomous program protocol 126 with lock and mint/burn functionality and an additional NFT gating requirement to limit interactions of the gated wrapper autonomous program protocol 126. For example, the gated wrapper autonomous program protocol 126 may include a deposit and lock function on the original blockchain unit 127. Any original blockchain unit 127 that is deposited to the gated wrapper autonomous program protocol 126 to exchange as a gated wrapped blockchain unit 128 is locked with the gated wrapper autonomous program protocol 126. As part of the process to lock the original blockchain unit 127 in custody with the gated wrapper autonomous program protocol 126, the gated wrapper autonomous program protocol 126 may use mint functions to generate gated wrapped blockchain units 128. In the case a redemption request is processed, the gated wrapper autonomous program protocol 126 may use burn functions to burn the gated wrapped blockchain unit 128 to return the original blockchain unit 127 in custody.

In some embodiments, the gating requirement in the wrapping process 200 may be represented and carried out by verifying an NFT. The gated wrapper autonomous program protocol 126 may include a gating function that is used to check whether the blockchain address associated with a user is authorized to interact with the gated wrapper autonomous program protocol 126. The gating function may invoke, for example, a function that is in the form of the 'BalanceOf( )' function (e.g., checking the balance) of the NFT autonomous program protocol 210. In response, the NFT autonomous program protocol 210 provides information regarding whether the blockchain address associated with the user has the required NFT. For example, the NFT autonomous program protocol 210 may respond with a ledger of the NFT autonomous program protocol 210 that shows a list of NFTs generated by the NFT autonomous program protocol 210 and the blockchain addresses of the owners of those NFTs. Alternatively or additionally, the 'BalanceOf( )' function may be directed to a specific blockchain address and the NFT autonomous program protocol 210 may respond with a quantity or a binary answer. In some embodiments, the NFT may take the form of a soulbound NFT that is not further transferrable once the NFT is assigned from the NFT autonomous program protocol 210 to a blockchain address. If the gating function determines that the blockchain address is in the possession of the NFT, this indicates that the gating requirement(s) in the example illustrated in the wrapping process 200 are met. Various functions provided by the gated wrapper autonomous program protocol 126 are thus executable by the blockchain address associated with the user, such as the function of wrapping (or depositing and minting), the function of unwrapping (burning and withdrawing), and the function of transferring the gated wrapped blockchain units to another blockchain address.

In the blockchain unit wrapping process 200, the gated wrapper autonomous program protocol 126 is gated by the NFT autonomous program protocol 210. The blockchain unit wrapping process 200 includes several components, which are represented as the NFT autonomous program protocol 210, a gated protocol admin 220, a user (a wallet owner) 230, and the gated wrapper autonomous program protocol 126. The NFT autonomous program protocol 210 may be associated with a blockchain address 0xab . . . cd. An administrator (e.g., an operator of the gating requirement platform 130 or the issuer server 140) may deploy and administer the gated wrapper autonomous program protocol 126 using the blockchain address of the administrator. The administrator may have a blockchain address of 0x98 . . . 76. A user 230, such as an end user, may be associated with a user blockchain address 0x12 . . . 34. The deployed gated wrapper autonomous program protocol 126 may include various functions such as the gated deposit and gated mint/burn functions, as discussed.

FIG. 2 illustrates an interaction flow in the blockchain unit wrapping process 200, in accordance with some embodiments. While the process 200 is described as blocks and steps, in some embodiments, the blocks and steps do not necessarily need to occur and do not need to occur in the order described. Also, one or more steps may be combined. At step 240, the administrator 220 selects the NFT autonomous program protocol 210 to serve as the gating requirement. For example, the gated protocol admin 220 may select the blockchain address of the NFT autonomous program protocol 210, 0xab . . . cd, as the verification proof mechanism for accessing autonomous program protocol 124. At step 242, the administrator 220 may deploy the gated wrapper autonomous program protocol 126 with the address of the NFT autonomous program protocol 210 as the gating mechanism. At step 246, the NFT autonomous program protocol 210 issues an NFT to the user blockchain address, 0x12 . . . 34. The user blockchain address will be required to meet the gating requirements of gated wrapper autonomous program protocol 126. At step 248, the user, with the user blockchain address, may initiate a deposit request to the gated wrapper autonomous program protocol 126. At step 250, the gated wrapper autonomous program protocol 126 may invoke the gating function. For example, the gated wrapper autonomous program protocol 126 may direct a request to the NFT protocol blockchain address, 0xab . . . cd, to check the balance of the user blockchain address, 0x12 . . . 34 at the NFT autonomous program protocol 210 to determine whether the NFT is associated with the user blockchain address, 0x12 . . . 34. If the BalanceOf( ) function's returned answer is not zero, the transaction is successful. At step 252, after verifying the gating requirement that is represented by the possession of the NFT, the user 230 is allowed to deposit a certain quantity of the blockchain unit 127 to the gated wrapper autonomous program protocol 126. The quantity of blockchain unit 127 is locked up in the deposit function of the gated wrapper autonomous program protocol 126. At step 254, the gated wrapper autonomous program protocol 126 mints a corresponding quantity (e.g., 1:1 ratio, or slightly lower than 1:1 because of the payment of transaction fee) of the gated wrapped blockchain unit 128 to the user blockchain address, 0x12 . . . 34.

While the process 200 shown in FIG. 2 is illustrated with the initial wrapping process, the same gating process may be used for the exchange of gated wrapped blockchain units 128 and withdrawal of the original blockchain units 127. For example, for exchange or withdrawal, at step 248, the user initiates the exchange or withdrawal request. The gated wrapper autonomous program protocol 126 verifies the possession of the NFT through inquiring the NFT autonomous program protocol 210. Afterward, the user may send the gated wrapped blockchain units 128 to another blockchain address or may return a quantity of the gated wrapped blockchain unit 128 to receive a corresponding quantity of the original blockchain unit 127.

While in various processes such as process 200 and process 300, the gated wrapper autonomous program protocol 126 is illustrated as having the wrapping, unwrapping, and transfer functionality, in various embodiments, the gated wrapper autonomous program protocol 126 may include any other functions that can be programmed. Any programmable services may be added to the gated wrapper autonomous program protocol 126 and wrapping, unwrapping, and transfer are merely examples used for the purpose of illustration. Also, while deposit is illustrated as the gated wrapper autonomous program protocol 126 holding the original blockchain unit 127 in custody, in various embodiments, deposit can also be achieved by different suitable ways. In some embodiments, deposit can take the form of virtual deposit where no actual transfer between wallets has occurred. For example, a protocol may render a blockchain unit 127 untransferable even though the blockchain unit 127 stays with a user's wallet.

Example Wrapping Processes with Issuers

Figure 3A:
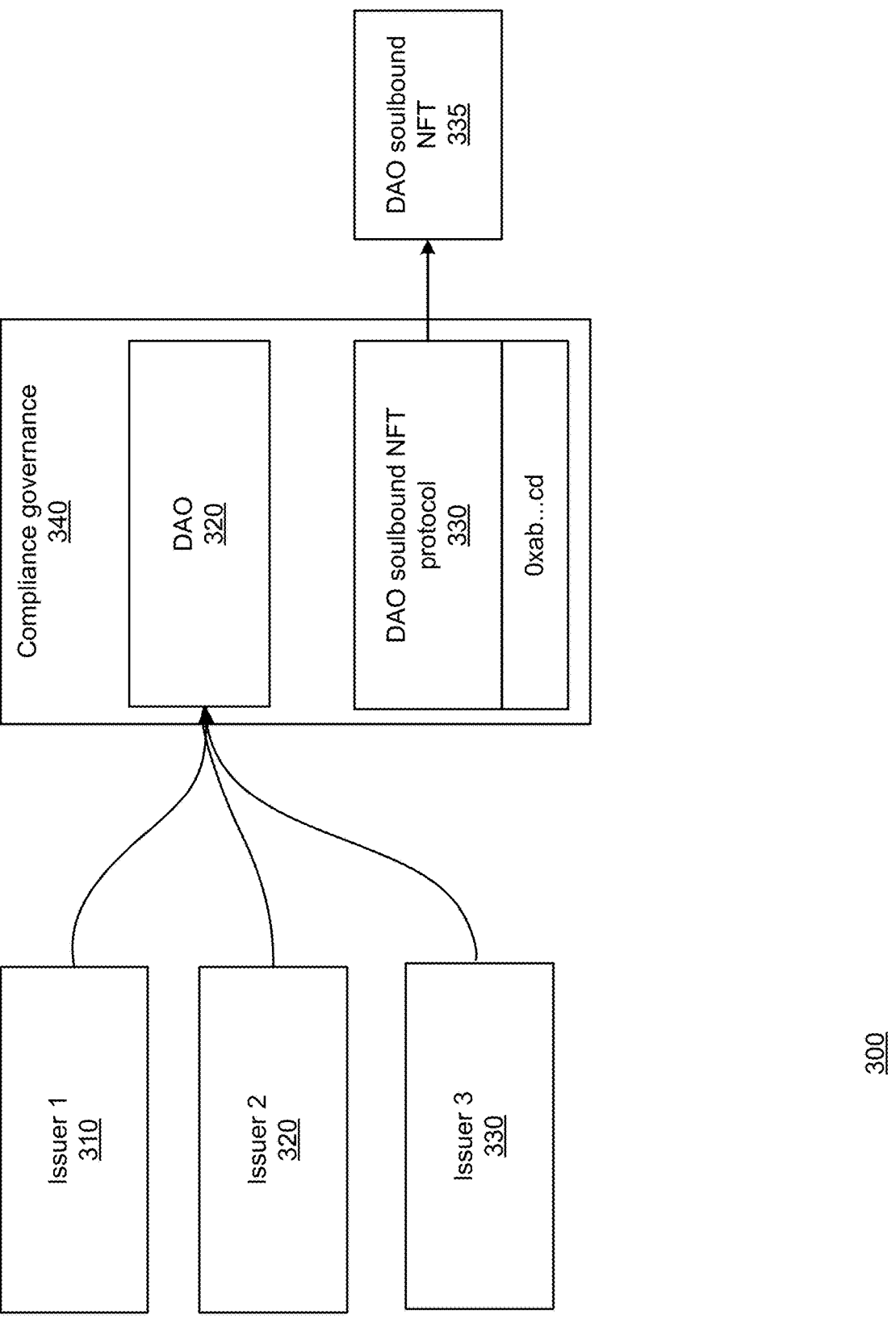
FIGS. 3A, 3B, and 3C are block diagrams an example blockchain unit wrapping process, in accordance with some embodiments.
Figure 3B:
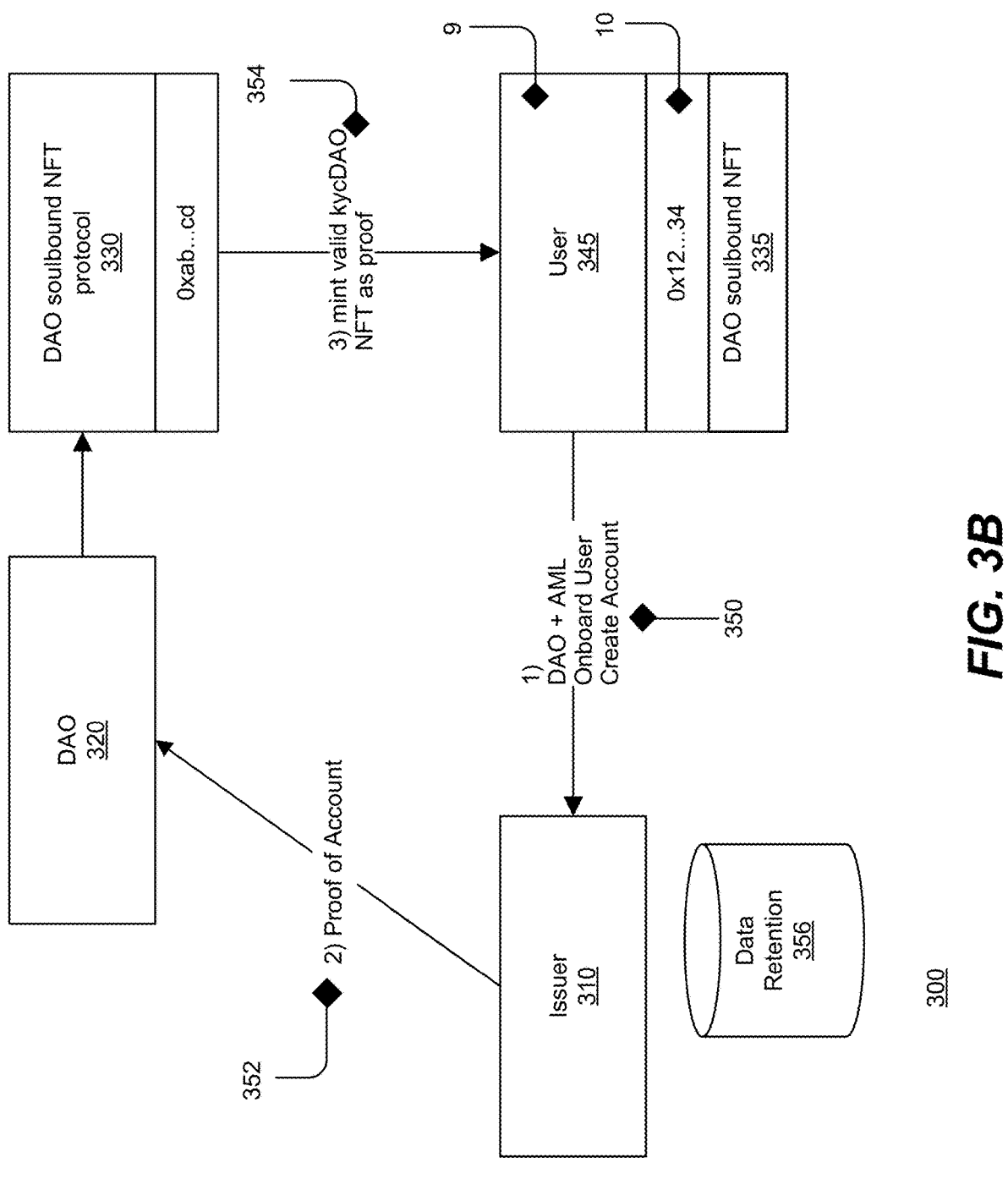
Figure 3C:
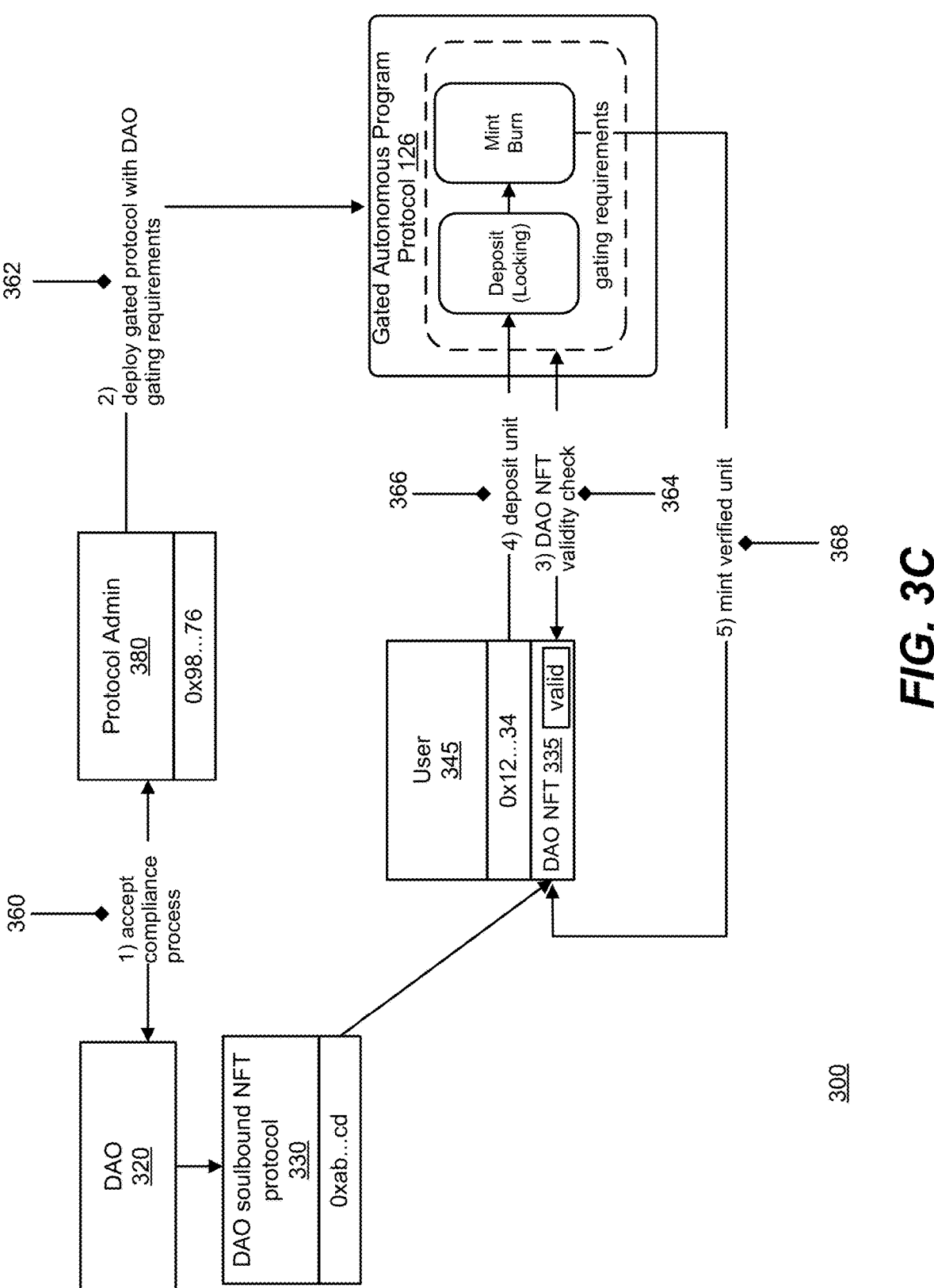

FIGS. 3A, 3B, and 3C are block diagrams an example blockchain unit wrapping process 300, in accordance with some embodiments. The blockchain unit wrapping process 300 may use decentralized autonomous organization (DAO) soulbound NFTs as permission for interactions. For example, the gated wrapper autonomous program protocol 126 may use a specific DAO soulbound NFT that proves that a user (a wallet owner) interacting with the gated wrapper autonomous program protocol 126 has a valid verification with one of DAO's issuers 310. DAO may be an alliance of issuers 310. While the process 300 is illustrated with the DAO 320, any other suitable alliance, such as a centralized server, a distributed program, etc., may also be used in place of the DAO 320. The gated wrapper autonomous program protocol 126 may include the lock and mint/burn functionality and may be associated with an additional NFT gating requirement to limit interactions of the gated wrapper autonomous program protocol 126. For example, the gated wrapper autonomous program protocol 126 may include a deposit and lock function on the original blockchain unit 127. Any original blockchain unit 127 that is deposited to the gated wrapper autonomous program protocol 126 to exchange as a gated wrapped blockchain unit 128 is locked with the gated wrapper autonomous program protocol 126. As part of the process to lock the original blockchain unit 127 in custody with the gated wrapper autonomous program protocol 126, the gated wrapper autonomous program protocol 126 may use mint and burn functions to generate gated wrapped blockchain units 128.

While soulbound NFTs are used as examples in FIGS. 3A, 3B, and 3C, in some embodiments the NFTs do not need to be soulbound. In some embodiments, any forms of verification proof 125 may also be used.

In some embodiments, the gating requirement in the wrapping process 300 may be represented and carried out through verifying an NFT. The gated wrapper autonomous program protocol 126 may include a gating function that is used to check whether the blockchain address associated with a user is authorized to interact with the gated wrapper autonomous program protocol 126. The gating function may invoke, for example, a function that is in the form of the 'BalanceOf( )' function (e.g., checking the balance) of a DAO soulbound NFT autonomous program protocol 330. The DAO soulbound NFT autonomous program protocol 330 may be an example of the verification autonomous program protocol 124. In response, the DAO soulbound NFT autonomous program protocol 330 provides information regarding whether the blockchain address associated with the user has the required NFT. The gated wrapper autonomous program protocol 126 may also invoke a function, the 'Validity( )' function, that is directed to the DAO soulbound NFT autonomous program protocol 330 to determine whether the validity of an account associated with an issuer is valid. In some embodiments, the balance and validity requirements may be a combined gating requirement or two or more independent requirements, depending on implementations. If the gating function of the gated wrapper autonomous program protocol 126 determines the gating requirement(s) are met, various functions provided by the gated wrapper autonomous program protocol 126 are thus executable by the blockchain address associated with the user, such as the function of wrapping (or depositing and minting), the function of unwrapping (burning and withdrawing), the function of transferring the gated wrapped blockchain units to another blockchain address, or any other type of function that can be programmed.

The process 300 may include different components in a decentralized autonomous organization framework. Example components may include one or more verification issuers 310, the DAO 320, the DAO soulbound NFT autonomous program protocol 330, and the compliance governance framework 340. The DAO 320 may be the governing framework for DAO soulbound NFT autonomous program protocol 330. The DAO 320 may be an example of the gating requirement platform 130 or may be part of the gating requirement platform 130. The DAO soulbound NFT autonomous program protocol 330 may be associated with a blockchain address 0xab . . . cd. The compliance governance framework 340 of the DAO 320 sets the requirements for the issuers 310, enabling web3 services to trust the DAO 320 to issue DAO soulbound NFTs 335 that represent compliant accounts. A DAO soulbound NFT 335 represents an active account with the issuer. As soon as this account is no longer active, the DAO managed NFT autonomous program protocol 330 will update the validity of the soulbound NFT 335 issued to the user's blockchain address from "Valid" to "Invalid." For example, the metadata of the soulbound NFTs 335 minted by the NFT autonomous program protocol 330 has a special Validity( ) field.

FIG. 3B illustrates an interaction flow in the blockchain unit wrapping process 300 that issues a DAO NFT as a proof of satisfaction of gated requirements, in accordance with some embodiments. While the process 300 is described as blocks and steps, in some embodiments, the blocks and steps do not necessarily need to occur and do not need to occur in the order as described. FIG. 3B illustrates an example flow of how a DAO soulbound NFT 335 is issued to a user 345, who is associated with a blockchain address 0x12 . . . 34.

At step 350, the user 345, who is a wallet owner, opens an account with an issuer 310. Account opening may involve various identity verification processes such as KYC and various AML processes. The account is opened with an issuer 310. The gating requirements for opening the account may include but are not limited to verification, data retention, continuous AML, data sharing, travel rule, and/or minimum expected regulatory engagement are in line with the requirements set by the compliance governance 340 of the DAO 320. After the account is successfully opened, at step 352, the issuer 310 provides the proof of accounts to the DAO 320. The proof of accounts may include a list of multiple accounts that correspond to different users. The proof of accounts may include the blockchain address that belongs to the user 345, indicating that the user 345 has a compliant account with the issuer 310. This represents that the user's blockchain address should be safe to be listed for minting a DAO soulbound NFT 335. In response to receiving the proof of account, the DAO 320 causes the DAO soulbound NFT autonomous program protocol 330 to issue the DAO soulbound NFT 335 to the user blockchain address. For example, the DAO 320 may use an oracle machine 132 to cause the NFT autonomous program protocol 330 to generate the NFT 335. Regulatory-compliant Personal Identifiable Information (PII) data storage may be maintained by the issuer 310 for regulatory purposes in data retention 356.

FIG. 3C illustrates an interaction flow in the blockchain unit wrapping process 300 that generates gated wrapped blockchain units 128 using the DAO soulbound NFT 335 for gating, in accordance with some embodiments. The process illustrated in FIG. 3C is similar to the process illustrated in FIG. 2 except a DAO soulbound NFT 335 is used as a verification proof 125. In addition, a validity function is used in the gated wrapper autonomous program protocol 126 to check the validity of a DAO NFT 335.

At step 360, an administrator 380 may select the DAO 320 to control the gating requirements and may accept the compliance process provided by the DAO 320. For example, the administrator 380 may select the blockchain address of the DAO soulbound NFT protocol 330, 0xab . . . cd, as the verification proof mechanism for accessing the autonomous program protocol 136. The administrator 380 may select DAO's compliance processes as adequate for the gated wrapper autonomous program protocol 126 to meet the required regulatory requirements.

At step 362, the administrator 380 may deploy the gated wrapper autonomous program protocol 126 with the address of the DAO soulbound NFT protocol 330 as the gating mechanism. The DAO soulbound NFT protocol 330 has issued a DAO soulbound NFT 335 to the user blockchain address, 0x12 . . . 34, as illustrated in FIG. 3B. The user blockchain address will be required to meet the gating requirements of gated wrapper autonomous program protocol 126. The user, with the user blockchain address, may initiate a deposit request to the gated wrapper autonomous program protocol 126. At step 364, the gated wrapper autonomous program protocol 126 may invoke the gating function to conduct one or more gating checks. For example, the gated wrapper autonomous program protocol 126 may direct a request to the NFT protocol blockchain address, 0xab . . . cd, to check the balance of user blockchain address, 0x12 . . . 34 at the DAO soulbound NFT protocol 330 to determine whether the DAO soulbound NFT 335 is associated with the user blockchain address, 0x12 . . . 34. If the BalanceOf( ) function's returned answer is not zero, this gating requirement is satisfied. Additionally, or alternatively, the gated wrapper autonomous program protocol 126 may also check the validity of the DAO soulbound NFT 335, which has a metadata field that represents whether the user's issuer account is valid. If the DAO soulbound NFT protocol 330 also returns a valid answer, the validity gating requirement is also satisfied. Additional gating requirements may be present in various embodiments but are not illustrated in FIG. 3C.

At step 366, after verifying various gating requirements, the user 345 is allowed to deposit a certain quantity of the blockchain unit 127 to the gated wrapper autonomous program protocol 126. The quantity of blockchain unit 127 is locked up in the deposit function of the gated wrapper autonomous program protocol 126. At step 368, the gated wrapper autonomous program protocol 126 mints a corresponding quantity (e.g., 1:1 ratio, or slightly lower than 1:1 by deducting transaction fee) of the gated wrapped blockchain unit 128 to the user blockchain address, 0x12 . . . 34.

Similar to the process 200, while the process 300 shown in FIG. 3C is illustrated with the initial wrapping process, the same gating process may be used for transfer of the gated wrapped blockchain units 128 to another blockchain address and withdrawal of the original blockchain units 127. For example, for exchange or withdrawal, the user may initiate an exchange or withdrawal request. The gated wrapper autonomous program protocol 126 verifies the possession of the DAO soulbound NFT 335 through inquiring the DAO soulbound NFT protocol 330. Afterwards, the user may send the gated wrapped blockchain units 128 to another blockchain address or may return a quantity of the gated wrapped blockchain unit 128 with a corresponding quantity of the original blockchain unit 127.

As the compliance processes are set by the DAO 320, the gated wrapper autonomous program protocol 126 may rely on the Validity( ) function to inquiry the status of the minted DAO soulbound NFTs 335 to determine whether accounts are valid. As long as the blockchain address interacting with the gated wrapper autonomous program protocol 126 is in the 'valid' status, in some embodiments, the requirements for compliance set by DAO 320 are in place and can be relied upon.

Figure 4:
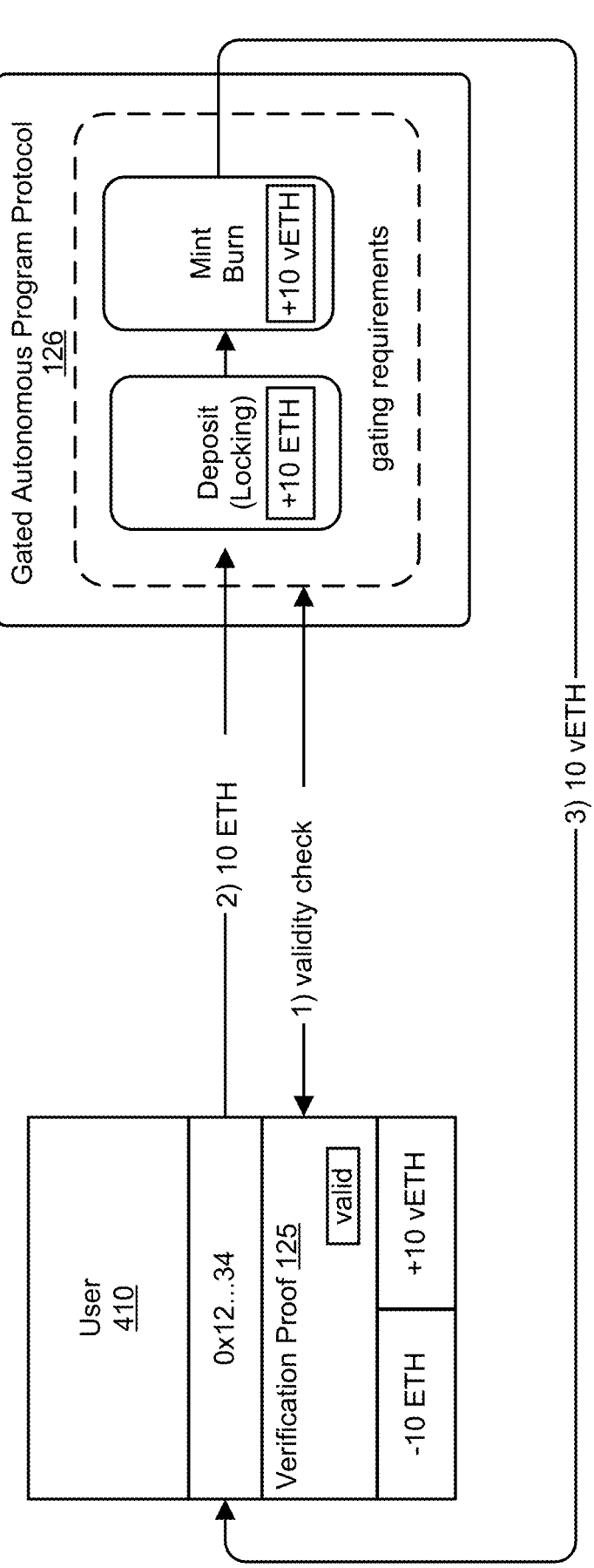
FIG. 4 is a block diagram illustrating an example process for wrapping a certain quantity of blockchain units, in accordance with some embodiments.

FIG. 4 is a block diagram illustrating an example process 400 for wrapping a certain quantity of blockchain units, in accordance with some embodiments. While 10 ETH is used as an example in FIG. 4, in various embodiments the blockchain unit can be any blockchain unit 127 and the quantity may also be any value and does not need to be an integer.

In FIG. 4, a user 410 may have a user blockchain address of 0x12 . . . 34. The user blockchain address is associated with a verification proof 125. The verification proof may be any suitable on-chain proof, including such as the NFT illustrated in FIG. 2 and the DAO soulbound NFT 335 illustrated in FIG. 3C. Other examples of the verification proof 125 are discussed in FIG. 1. The user 410 may initiate a deposit request of 10 ETH with the gated wrapper autonomous program protocol 126. The gated wrapper autonomous program protocol 126 performs the validity check of the verification proof 125, which may be directed to another autonomous program protocol, as illustrated in FIGS. 1, 2, and 3C. The verification proof 125 may represent the satisfaction of the gating requirements. The gating requirements may include various off-chain checks that are performed by any suitable mechanisms, as discussed in FIG. 1. After the gating requirements are determined to be satisfied, the user 410 may deposit the 10 ETH. The deposit function of the gated wrapper autonomous program protocol 126 locks the 10 ETH and the mint function mints 10 vETH (e.g., verified ETH) to the user blockchain address.

Example Wrapping and Exchange Processes

Figure 5:
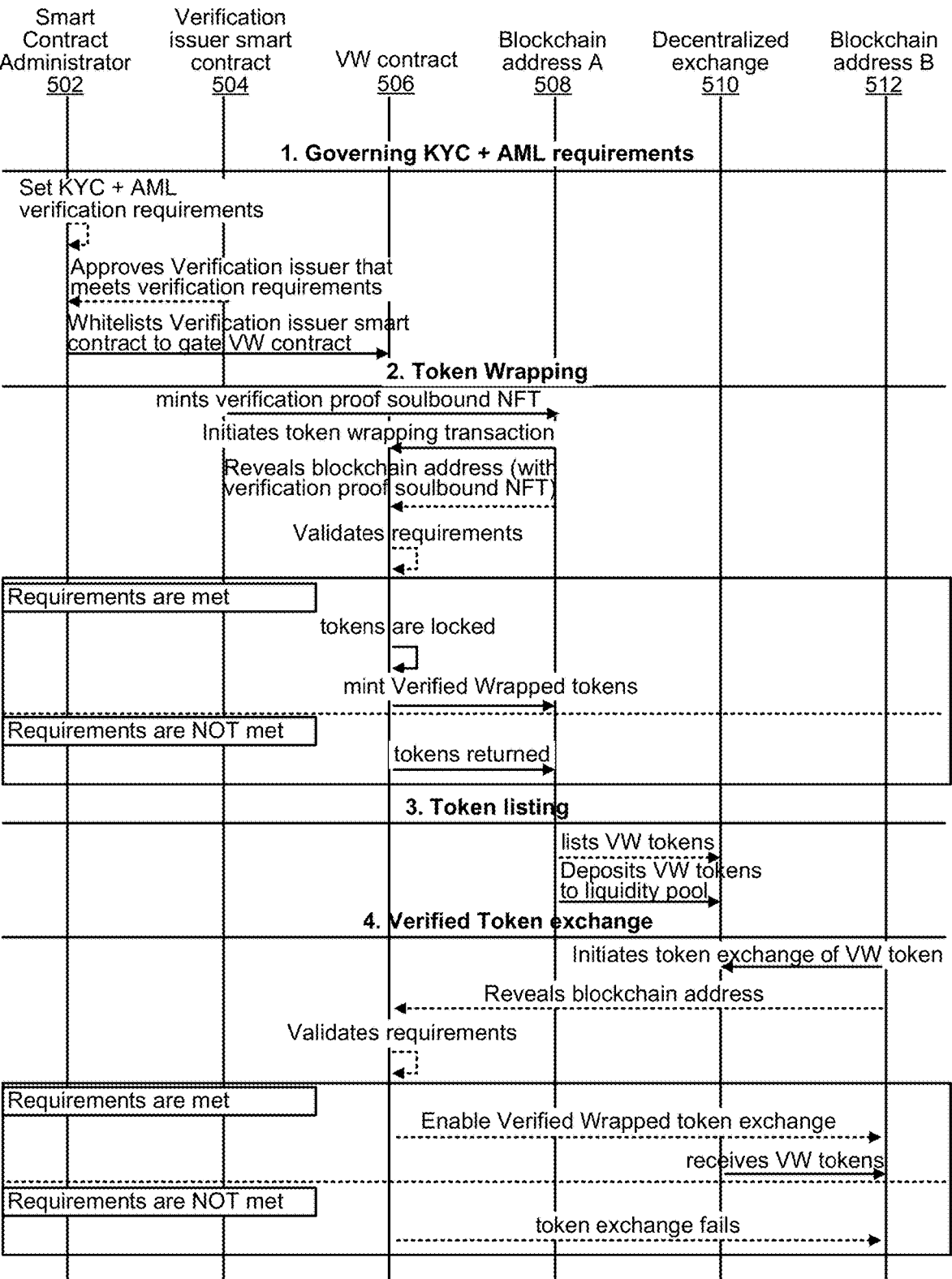
FIG. 5 is an event flow diagram illustrating the actions and communications of an event flow performed by various components in wrapping, listing and exchanging wrapped blockchain units, in accordance with some embodiments.

FIG. 5 is an event flow diagram illustrating the actions and communications of an event flow 500 performed by various components in wrapping, listing and exchanging wrapped blockchain units, in accordance with some embodiments. The components in the event flow 500 may include a smart contract administrator 502, a verification issuer smart contract 504, a verified wrapper smart contract 506, a blockchain address A 508, a decentralized exchange 510, and a blockchain address B 512. The decentralized exchange 510 may take the form of an autonomous program protocol 122 such as a decentralized exchange smart contract. The smart contract administrator 502 may be the administrator of the verified wrapper smart contract 506, which is an example of the gated wrapper autonomous program protocol 126. The smart contract 504 may be an example of a verification autonomous program protocol 124. The blockchain address A 508 and blockchain address B 512 are blockchain addresses of two blockchain wallets. The decentralized exchange 510 may be an example of the exchange server 150.

In the governing administration phase, the smart contract administrator 502 sets identity verification and KYC AML process requirements. The smart contract administrator 502 selects an on-chain verification issuer framework, such as the DAO framework illustrated in process 300, that creates compliant composable proofs of valid accounts with DAO issuer 310 that takes identity verification liability. The smart contract administrator 502 adds the verification issuer smart contract 504 (e.g., the DAO soulbound NFT autonomous program protocol 330) as the gating requirements to the verified wrapper smart contract 506.

In the token wrapping phase, the verification issuer smart contract 504 mints soulbound NFTs with validity status to blockchain addresses whose owners meet the requirement to become a DAO NFT owner. For example, a DAO NFT is minted to the blockchain address A 508. Blockchain Address A 508 deposits selected token (e.g., ETH) to the verified wrapper smart contract 506. The selected token may be an example of the original blockchain unit 127.

The verified wrapper smart contract 506 checks the balance of and the validity status for DAO NFTs. For example, the check may be represented by the following logics:

If BalanceOf( )>1 and Validity( )==valid;
> The deposited ETH gets locked up and the verified ETH is minted to Blockchain Address A 508.
If BalanceOf( )<1 or Validity( )!=valid;
> The deposit transaction fails.

In the token listing phase, the blockchain address A 508 creates a liquidity pool on a decentralized exchange 510 such as the Uniswap by listing a pair of token addresses of verified tokens (e.g., verified ETH andverified USDC) as a trading pair. The verified tokens are examples of the gated wrapped blockchain units 128. The blockchain address A 508 deposits the verified tokens to the newly created trading pair (e.g., as the first liquidity provider).

In the verified token exchange phase, the blockchain address B 512 initiates an exchange from verified USDC to verified ETH. The verified wrapper smart contract 506 checks 'BalanceOf( )' and 'Validity( )' status for DAO NFTs for the blockchain address B 512 to verify the gated requirements. Verified ETH is transferred to Blockchain Address B from the liquidity pool contract. If the verification of the gated requirements fails, the exchange transaction will also fail.

In some embodiments, one or more additional or alternative requirements may be used. For example, any decentralized exchange smart contracts that interact with the verified wrapper smart contract 506 may be required to have DAO NFT and are part of the gating requirements of the verified wrapper smart contract 506. Additionally, or alternatively, any DAO soulbound NFTs may contain a validity metadata that represents the address owner's live account at one of DAO issuers. This validity represents that the issued proof meets the requirements set by the DAO.

The event flow 500 may be applied to implement compliant blockchain unit transfer using verified wrapped blockchain units. For example, a transaction between two blockchain addresses using gated wrapped blockchain units 128 can meet international financial transfer requirements. The originator blockchain address that meets the gating requirements of the gated wrapper autonomous program protocol 126 can successfully initiate a transaction using gated wrapped blockchain units 128 that meet financial transfer compliance. The transaction is only finalized when the receiving blockchain address also meets the gating requirements of the gated wrapper autonomous program protocol 126. In a case where the receiving blockchain address does not meet the gating requirements, the receiving blockchain address will be unable to interact with the received gated wrapped blockchain units 128, rendering the gated wrapped blockchain units 128 unusable. The transaction is not finalized as the receiving blockchain address does not meet the regulatory requirements.

The international financial transfer requirements, for example, FATF Travel Rule, may require the originators and beneficiaries of transfers of digital funds to exchange identification information. The originators and beneficiaries may also be required to be able to guarantee the accuracy of the information they send to each other. For example, a soulbound NFT (e.g., non-transferable NFT) can be used to represent the compliant proof of valid identity verification as the required blockchain resources for the verified wrapper autonomous program protocol, without disclosing personal information about the verified blockchain address holder. DAO soulbound NFT and soulbound signature design is a good example of such NFTs. The issuer of the verification can ensure that the transaction meets financial transaction requirements as the involved qualifying blockchain addresses are verified. The verification issuers may be approved by the administrator of the gated wrapper autonomous program protocol 126. In case wherein information exchange is also required related to the transaction, the data exchange can take place securely (and potentially off-chain) between issuers.

In some embodiments, the originator blockchain address sends verified USDC (wrapped USDC stable coin minted by the gated wrapper autonomous program protocol 126) to another blockchain address. Using the processes in various embodiments, such as the process 500, institutions, SMBs, individuals, and legal persons can transfer blockchain units without disclosing their personal information to the other party while meeting regulatory requirements. Before the initiation of the blockchain unit transfer, the originator can look up the existence of the proof of verification, in this case, a non-transferable NFT as a proof that the counter party meets the regulatory requirements.

Example Transfer Compliance Process

Figure 6:
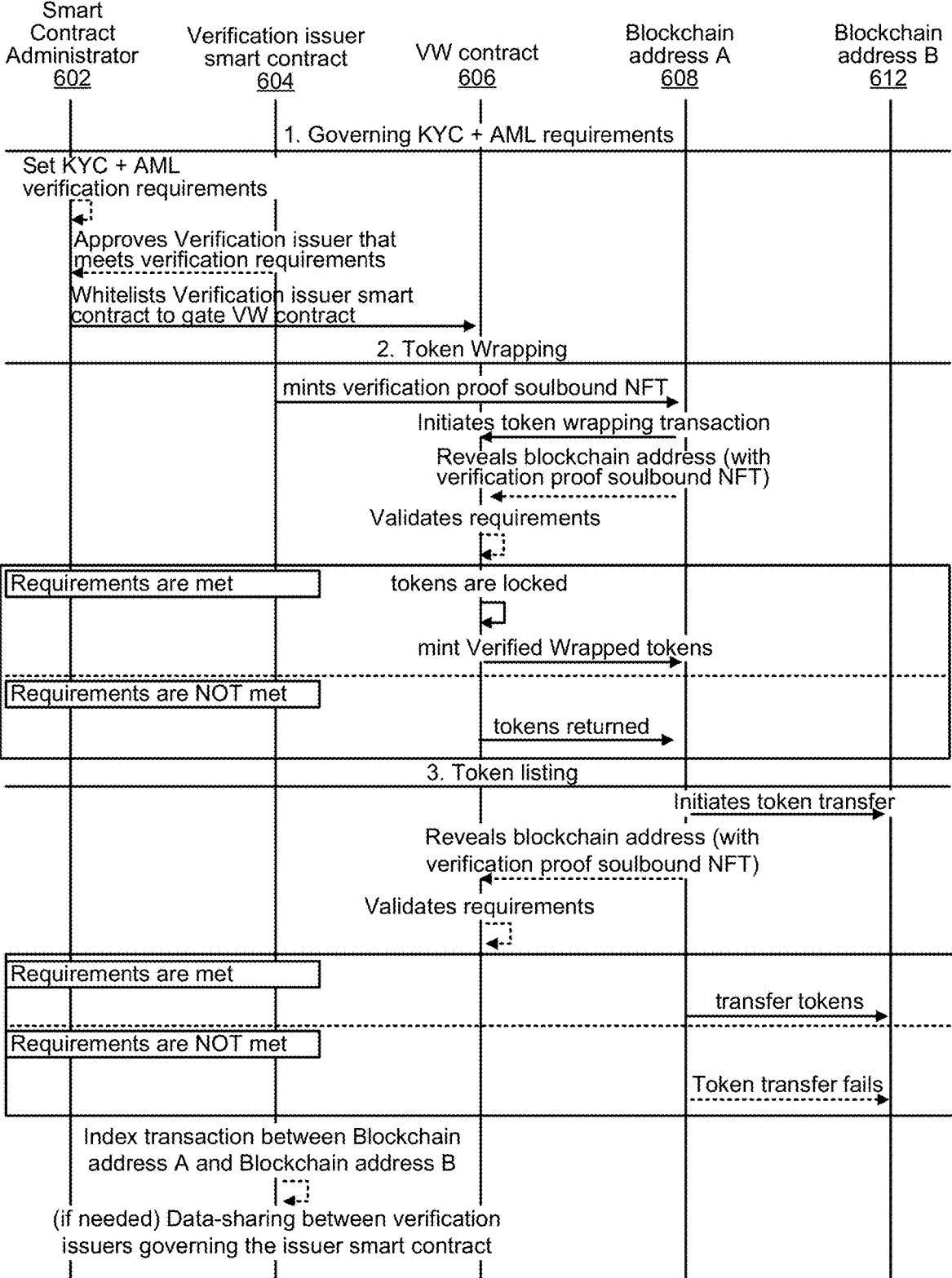
FIG. 6 is an event flow diagram illustrating the actions and communications of an event flow performed by various components in wrapping and exchanging wrapped blockchain units, in accordance with some embodiments.

FIG. 6 is an event flow diagram illustrating the actions and communications of an event flow 600 performed by various components in wrapping and exchanging wrapped blockchain units, in accordance with some embodiments. The components in the event flow 600 may include a smart contract administrator 602, a verification issuer smart contract 604, a verified wrapper smart contract 606, a blockchain address A 608, and a blockchain address B 612. Unlike FIG. 5, an exchange is not involved in FIG. 6. The smart contract administrator 602 may be the administrator of the verified wrapper smart contract 606, which is an example of the gated wrapper autonomous program protocol 126. The smart contract 604 may be an example of a verification autonomous program protocol 124. The blockchain address A 608 and blockchain address B 612 are blockchain addresses of two blockchain wallets.

In the governing administration phase, the smart contract administrator 602 sets identity verification and KYC AML process requirements. The smart contract administrator 602 selects an on-chain verification issuer framework, such as the DAO framework illustrated in process 300, that creates compliant composable proofs of valid accounts with DAO issuer 310 that takes identity verification liability. The smart contract administrator 602 adds the verification issuer smart contract 604 (e.g., the DAO soulbound NFT autonomous program protocol 330) as the gating requirements to the verified wrapper smart contract 606.

In the token wrapping phase, the verification issuer smart contract 604 mints soulbound NFTs with validity status to blockchain addresses whose owners meet the requirement to become a DAO NFT owner. For example, a DAO NFT is minted to the blockchain address A 608. Blockchain Address A 608 deposits selected token (e.g., ETH) to the verified wrapper smart contract 606. The selected token may be an example of the original blockchain unit 127.

The verified wrapper smart contract 606 checks the balance of and the validity status for DAO NFTs. For example, the check may be represented by the following logics:
If BalanceOf( )>1 and Validity( )==valid;
> The deposited ETH gets locked up and the verified ETH is minted to Blockchain
Address A 608.
If BalanceOf( )<1 or Validity( )!=valid;
> The deposit transaction fails.

In the verified token transfer phase, the blockchain address A 608 initiates a token transfer to the blockchain address B 612. The verified wrapper smart contract 606 checks 'BalanceOf( )' and 'Validity( )' status for DAO NFTs for the blockchain address B 612 to verify the gated requirements. After a successful verification of the gated requirements, verified token is transferred to Blockchain Address B from the blockchain address A 608. If the verification of the gated requirements fails, the exchange transaction will also fail.

In the process 600, a DAO can ensure data sharing and other regulatory requirements are met. The smart contract administrator 602 does not need to create additional governance for this example.

In some embodiments, the process 600 may include one or more additional or alternative requirements. For example, the DAO soulbound NFTs may contain a validity metadata that represents the address owner's live account at one of DAO issuers. This validity represents that the issued proof meets the requirements set by the DAO.

Example Applications

Various processes and architecture described throughout this disclosure may have different applications. For example, in some embodiments, a gated wrapper autonomous program protocol 126 and the corresponding wrapped blockchain units 128 may require an identity verification-related blockchain resource. This type of gated wrapper autonomous program protocol 126 enables blockchain units, blockchain addresses, transactions, and autonomous program protocols to meet regulatory requirements.

In some embodiments, the gated wrapper autonomous program protocols 126 may include a special type that may be referred to as verified wrapper autonomous program protocols. The administrator, the verified wrapper autonomous program protocol, or verified wrapped blockchain units, can require the interacting blockchain address owner to pass identity verification and related measures and to have proof of a valid verification as a blockchain resource. The governance of the identity verification requirements may be performed off-chain by the gating requirement platform 130 such as through a DAO, and/or by the issuer server 140. A gated wrapped blockchain units 128 that is also verified with identity may be used to create compliant permissioned blockchain units on any type of blockchain 120.

In some embodiments, various gating requirements may be used. Gating requirements may include but are not necessarily limited to resources that can express validity or expiry status of the verification, verification methods used to verify the blockchain address' owner (KYC, KYB, Investor Accreditation, etc.), types of legal person the verification relates to, relationships between blockchain addresses, history of transactions of the blockchain address, transaction history of blockchain units held or controlled by the blockchain address, audit-related information, anti-money laundering related information, any personal identifiable information related to the legal person, data linked directly or indirectly to the resource in an off-chain data set, information about the verification issuer.

A soulbound NFT (e.g., non-transferable NFT) can be used to represent the compliant proof of valid identity verification as the required blockchain resources for the verified wrapper autonomous program protocol, without disclosing personal information about the verified blockchain address holder. DAO soulbound NFT and soulbound signature design is a good example of such NFTs. The issuer of the verification can ensure that the transaction meets financial transaction requirements as the involved qualifying blockchain addresses are verified. The verification issuers may be approved by the administrator of the gated wrapper autonomous program protocol 126. In case wherein information exchange is also required related to the transaction, the data exchange can take place securely (and potentially off-chain) between issuers.

Using one or more processes described, a compliant decentralized exchange using gated wrapped blockchain units 128 may be implemented, in accordance with some embodiments. Gated wrapped blockchain units 128, by design, are compliant blockchain units that may be used for decentralized services to meet regulatory requirements. Gated wrapped blockchain units 128 may be integrated into decentralized exchanges to create compliant liquidity pools and compliant liquidity pairs without modifying the exchange's current infrastructure. The requirements set by the administrator of the gated wrapper autonomous program protocol 126 may limit blockchain addresses that can interact with the gated wrapped blockchain units 128 and the liquidity pool, moving the compliance requirement away from the decentralized exchange.

A decentralized exchange may offer compliant liquidity pools without modifying its infrastructure. For example, a decentralized exchange (or anyone) can list verified ETH (wrapped Ethereum minted from the gated wrapper autonomous program protocol 126) and verified USDC (wrapped USDC minted from the gated wrapper autonomous program protocol 126) trading pairs. The various gated wrapped blockchain units 128 may be in compliance with one or more token standards (e.g., ERC-20 standard on EVM chains). Using gated wrapped blockchain units 128 in liquidity pools allows that blockchain addresses to trade, interact and provide liquidity that are, by design, compliant according to the gating requirements. This can enable decentralized platforms to stay decentralized while meeting regulatory requirements to trade compliant blockchain units. In some embodiments, the governance of the gated wrapper autonomous program protocol 126 is not managed by the decentralized exchange but by the administrator of the gated wrapper autonomous program protocol 126. The issuers of the verifications required by the administrator may ensure that the participating blockchain address owners are verified and meet regulatory requirements.

In some embodiments, using one or more processes described in this disclosure, crypto on and off ramps requiring gated wrapped blockchain units 128 may be implemented. A crypto on-ramp may be a website, app, or service that allows users to buy blockchain units with fiat money. A crypto off-ramp is a website, app, or service that allows users to sell blockchain units in exchange for fiat money. An on-ramp could transfer gated wrapped blockchain units 128 to a blockchain address of a wallet connected to the on-ramp service at the time of purchase. Through this, on-ramps can ensure that regardless of the verification status of the receiving blockchain address associated with the purchaser, the on-ramp service blockchain address is verified to be able to interact with the received gated wrapped blockchain units 128. An off-ramp could accept gated wrapped blockchain units 128 from the connected wallet at the time of pay-out. Through this, off-ramps can ensure that the wallet owner has been verified to be able to send gated wrapped blockchain units 128.

In some embodiments, using one or more processes described in this disclosure, lending using gated wrapped blockchain units 128 may be implemented. A lender could send gated wrapped blockchain units 128 to the borrower's blockchain address. Through this, the lender can offer better rates to the borrower, ensuring that the borrower is verified to interact with the received gated wrapped blockchain units 128. The borrower can repay the loan using gated wrapped blockchain units 128.

In some embodiments, using one or more processes described in this disclosure, investment vehicles using gated wrapped blockchain units 128 may be implemented. Using Gated wrapped blockchain units 128 to fund the investment vehicle and using the vehicle to invest, participants of the transactions are verified according to the gating requirements.

In some embodiments, using one or more processes described in this disclosure, one or more financial instruments may be implemented. A financial instrument may be implemented to address the issue that a participant can engage with any exchange of value or risk between any other participant, protocol, or entity, including those that use blockchain unitized resources directly or indirectly, or where the blockchain unitized resource is present but obscured by various layers of complexity. An instrument dependent on factors residing outside of the blockchain ecosystem may be implemented, including and especially regulatory oversight with respect to its issuance or issuer, management, execution, or in any way contingent on the good-standing, legal or otherwise, of a person or organization interacting with said instrument. An instrument may also be implemented where assurances, guarantees, mandates, or any intrinsic or extrinsic reference to trust in a governing body's ability to police said instrument, hold its creators or participants to account, or intervene in any aspect of the instrument's operation.

By way of example, a small business loan structure whereby a centralized actor may issue blockchain unitized loans to individuals or businesses in accordance with the financial laws of their region. After the loan is issued, its blockchain unit representation can be sold as securities to recover the cost of the loan by the issuer quickly while allowing the risk of the loan to be distributed over a diverse group of investors. Enforcement of securitization laws and borrowing/lending legislation for the region, as well as policing the use and consumption of the instrument, can be conveniently managed by requiring that the loan recipient, issuer and reseller, and investors be known and approved for participation using the gating requirement mechanism described. In traditional financial infrastructure, cumbersome and unreliable record-keeping practices and nebulous or vague processes for access to information by authorities can impede the rule of law. In contrast, an immutable and public blockchain puts the parties and transactions into full view of regulators.

In another example, a bail bond is a binding agreement between a criminal defendant and the court, whereby the defendant must appear for trial or pay a sum of money determined by the court. Bail bonds are a commercial enterprise in some countries, such as in the United States and the Philippines. After a judge determines the bail amount, the defendant may either remain in jail for the duration of the trial, pay the bail, or arrange for a bond. A bondsman, or bond agent, is someone who agrees to pay the court the bail amount on behalf of the defendant if the defendant fails to appear for trial. The bond agent collects up-front fees from the defendant. The bond agent takes a risk, which can be distributed via blockchain unitization of the bond, which can be bought and re-sold by other bond agents in the network. Bond agents require special licensing, and the fees they charge are strictly policed.

As with the bail bond example, unreliable records and poor infrastructure make these instruments difficult to oversee. In contrast, an immutable public blockchain using the gated wrapper autonomous program protocol 126 gives authorities insight into how these industries operate, while also empowering bond agents to develop increasingly sophisticated systems to manage their risk.

In some embodiments, using one or more processes described in this disclosure, gated wrapped stable coins may be implemented.

In some embodiments, using one or more processes described in this disclosure, in-game gated wrapped blockchain units 128 may be implemented. In-game economy often involves a balance of issuance and depreciation. Creating an in-game blockchain unit based on public blockchain units enables the game admin to have tighter control over who is able to interact with the currency introduced to be used only within the game. The in-game blockchain unit may be created as a gated wrapped blockchain unit 128.

For example, an NFT (avatar) based game introduces an in-game currency to reward certain player activity and boost its internal market to trade their game-related blockchain units between holders of the NFT (avatar). The new gated wrapped blockchain unit 128 introduces trust while avoiding externalities in the in-game currency's value, while the in-game project is able to stay decentralized. The game admin can introduce a fee for wrapping, ensuring a new source of revenue. Multiple games with several different entry requirements may partner up to introduce a shared gated wrapped blockchain unit 128 as an in-game currency to share governance and issuance across the partners. The games can have a more direct impact on the use of the currency through the gating, setting a mechanism and markets for the project.

In some embodiments, using one or more processes described in this disclosure, community based gated wrapped blockchain units 128 may be implemented. Communities, such asDAOs (Decentralized Autonomous Organizations) or another type of groups can create community blockchain units that only community members are able to interact with. The community blockchain units may be generated by a gated wrapper autonomous program protocol 126 as gated wrapped blockchain units 128. The membership to these communities is set by one or more variations of blockchain verification resources.

In some embodiments, using one or more processes described in this disclosure, marketplace-specific gated wrapped blockchain units 128 may be implemented. For example, gated financial mechanisms for blockchain resources may be implemented. Examples can include but are not necessarily limited to the centralized and decentralized versions of swaps, exchanges, order book matching mechanisms, automated market makers, debt and lending (collateralized, or under- or un-collateralized), and flash loans.

In some embodiments, gated marketplaces for games may be implemented. In some embodiments, gated marketplaces for blockchain resources may be implemented. In some embodiments, gated escrow or custody of blockchain resources may be implemented. In some embodiments, gated supply adjustment of blockchain resources may be implemented. The adjustments may include burn, mint, bonding curves, and incentives (staked, direct, slashed, fees). In some embodiments, gated marketplaces for data may be implemented. In some embodiments, gated marketplaces for information blockchain unit may be implemented.

In some embodiments, using one or more processes described in this disclosure, industry-specific gated wrapped blockchain units 128 may be implemented. Examples may include flight industry specific gated blockchain units, hospitality industry specific gated blockchain units, real estate and rental and leasing specific gated blockchain units, HR or recruiting specific gated blockchain units, mining specific gated blockchain units, manufacturing specific gated blockchain units, agriculture, forestry, fishing and hunting specific gated blockchain units, transportation and warehousing specific gated blockchain units, construction specific gated blockchain units, educational services specific gated blockchain units, information specific gated blockchain units, arts, entertainment and recreation specific gated blockchain units, utilities specific gated blockchain units, administration, business support and waste management services specific gated blockchain units, wholesale trade specific gated blockchain units, accommodation and food services specific gated blockchain units, retail trade specific gated blockchain units, finance and insurance specific gated blockchain units, professional, scientific and technical services specific gated blockchain units, public administration specific gated blockchain units, sports related gated blockchain units, travel related gated blockchain units, online retail related gated blockchain units, loyalty program or loyalty programs related gated blockchain units, betting related gated blockchain units, gambling related gated blockchain units, community or communities related gated blockchain units, DAO or DAOs related gated blockchain units, international trade related gated blockchain units, company or companies related gated blockchain units, and brand or brands related gated blockchain units.

Example Blockchain Architecture

Figure 7A:
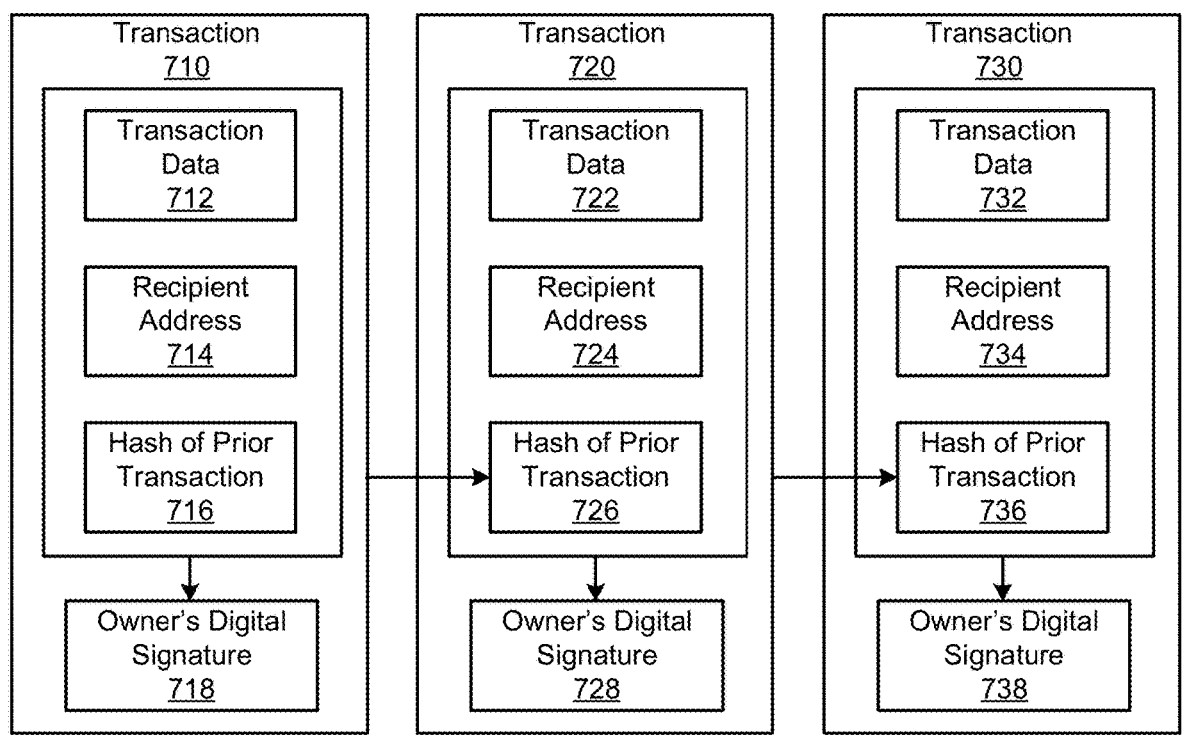
FIG. 7A is a block diagram illustrating a chain of transactions broadcasted and recorded on a blockchain, in accordance with some embodiments.

FIG. 7A is a block diagram illustrating a chain of transactions broadcasted and recorded on a blockchain, in accordance with some embodiments. The transactions described in FIG. 7A may correspond to any of the transactions and the transfer of blockchain-based units described in previous figures.

In some embodiment, a blockchain is a distributed system. A distributed blockchain network may include a plurality of nodes. Each node is a user or a server that participates in the blockchain network. In a public blockchain, any participant may become a node of the blockchain. The nodes collectively may be used as a distributed computing system that serves as a virtual machine of the blockchain. In some embodiments, the virtual machine or a distributed computing system may be simply referred to as a computer. Any users of a public blockchain may broadcast transactions for the nodes of the blockchain to record. Each user's digital wallet is associated with a private cryptographic key that is used to sign transactions and prove the ownership of a blockchain-based unit. The private key may be stored in the memory of a user device 110 that is possessed by the user. In another case, the private key may be stored in pieces in a distributed manner through techniques such as multi-party computation (MPC). In any case, regardless of the manner of storage of the private key, it is considered that a user device 110 is in possession of the private key.

The ownership of a blockchain-based unit may be traced through a chain of transactions. In FIG. 7A, a chain of transactions may include a first transaction 710, a second transaction 720, and a third transaction 730, etc. Each of the transactions in the chain may have a fairly similar structure except the very first transaction in the chain. The first transaction of the chain may be generated by a smart contract or a mining process and may be traced back to the smart contract that is recorded on the blockchain or the first block in which it was generated. While each transaction is linked to a prior transaction in FIG. 7A, the transaction does not need to be recorded on consecutive blocks on the blockchain. For example, the block recording the transaction 710 and the block recording the transaction 720 may be separated by hundreds or even thousands of blocks. The traceback of the prior block is tracked by the hash of the prior block that is recorded by the current block. In some embodiments, account model is used and transactions do not have any references to previous transactions. Transactions are not chained and do not contain the hash of the previous transaction.

Referring to one of the transactions in FIG. 7A, for illustration, the transaction 720 may be referred to as a current transaction. Transaction 710 may be referred to as a prior transaction and transaction 730 may be referred to as a subsequent transaction. Each transaction includes a transaction data 722, a recipient address 724, a hash of the prior transaction 726, and the current transaction's owner's digital signature 728. The transaction data 722 records the substance of the current transaction 720. For example, the transaction data 722 may specify a transfer of a quantity of a blockchain-based unit (e.g., a coin, a blockchain token, etc.). In some embodiments, the transaction data 722 may include code instructions of a smart contract.

The recipient address 724 is a version of the public key that corresponds to the private key of the digital wallet of the recipient. In some embodiments, the recipient address 724 is the public key itself. In another embodiment, the recipient address 724 an encoded version of the public key through one or more functions such as some deterministic functions. For example, the generation of the recipient address 724 from the public key may include hashing the public key, adding a checksum, adding one or more prefixes or suffixes, encoding the resultant bits, and truncating the address. The recipient address 724 may be a unique identifier of the digital wallet of the recipient on the blockchain. The private key may be a private key held by a device, a private key linked to a multi-signature wallet, a private key held by MPC mechanism, or another suitable private key.

The hash of the prior transaction 726 is the hash of the entire transaction data of the prior transaction 710. Likewise, the hash of the prior transaction 736 is the hash of the entire transaction data of the transaction 720. The hashing of the prior transaction 710 may be performed using a hashing algorithm such as a secure hash algorithm (SHA) or a message digest algorithm (MD). In some embodiments, the owner corresponding to the current transaction 720 may also use the public key of the owner to generate the hash. The hash of prior transaction 726 provides a traceback of the prior transaction 710 and also maintains the data integrity of the prior transaction 710.

In generating a current transaction 720, the digital wallet of the current owner of the blockchain-based unit uses its private key to encrypt the combination of the transaction data 722, the recipient address 724, and the hash of prior transaction 726 to generate the owner's digital signature 728. To generate the current transaction 720, the current owner specifies a recipient by including the recipient address 724 in the digital signature 728 of the current transaction 720. The subsequent owner of the blockchain-based unit is fixed by the recipient address 724. In other words, the subsequent owner that generates the digital signature 738 in the subsequent transaction 730 is fixed by the recipient address 724 specified by the current transaction 720. To verify the validity of the current transaction 720, any nodes in the blockchain network may trace back to the prior transaction 710 (by tracing the hash of prior transaction 726) and locate the recipient address 714. The recipient address 714 corresponds to the public key of the digital signature 728. Hence, the nodes in the blockchain network may use the public key to verify the digital signature 728. Hence, a current owner who has the blockchain-based unit tied to the owner's blockchain address can prove the ownership of the blockchain-based unit. In this disclosure, it can be described as the blockchain-based unit being connected to a public cryptographic key of a party because the blockchain address is derived from the public key. For example, the gating requirement platform 130 may own blockchain-based units in a machine learning model 235. The blockchain-based units are connected to one of the public cryptographic keys of the gating requirement platform 130. In some embodiments, an external partner may lock tokens on a blockchain address, rendering the tokens non-usable until the lock is removed.

The transfer of ownership of a blockchain-based unit may be initiated by the current owner of the blockchain-based unit. To transfer the ownership, the owner may broadcast the transaction that includes the digital signature of the owner and a hash of the prior transaction. A valid transaction with a verifiable digital signature and a correct hash of the prior transaction will be recorded in a new block of the blockchain through the block generation process.

Figure 7B:
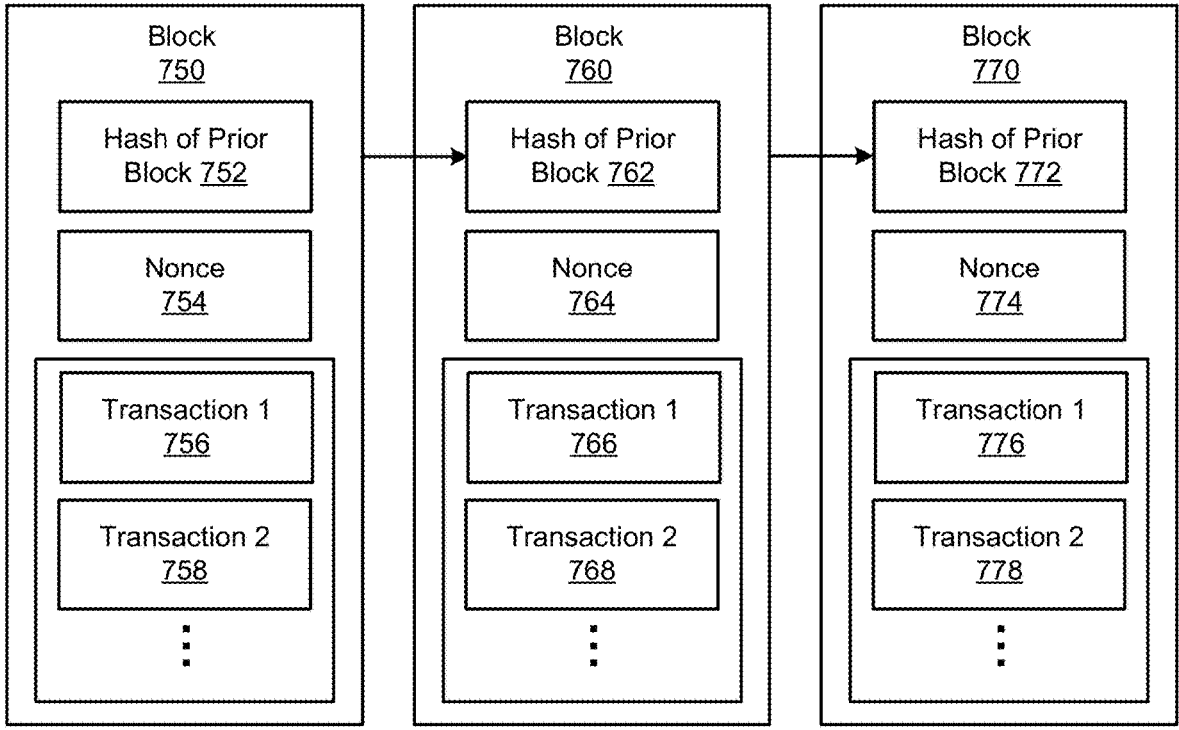
FIG. 7B is a block diagram illustrating a connection of multiple blocks in a blockchain, in accordance with some embodiments.

FIG. 7B is a block diagram illustrating a connection of multiple blocks in a blockchain, in accordance with some embodiments. Each block of a blockchain, except the very first block which may be referred to as the genesis block, may have a similar structure. The blocks 750, 760, and 760 may each include a hash of the prior blockchain 752, a nonce 754, and a plurality of transactions (e.g., a first transaction 756, a second transaction 758, etc.). Each transaction may have the structure shown in FIG. 7A.

In a block generation process, a new block may be generated through mining or voting. For a mining process of a blockchain, any nodes in the blockchain system may participate in the mining process. The generation of the hash of the prior block may be conducted through a trial and error process. The entire data of the prior block (or a version of the prior block such as a simplified version) may be hashed using the nonce as a part of the input. The blockchain may use a certain format in the hash of the prior block in order for the new block to be recognized by the nodes as valid. For example, in some embodiments, the hash of the prior block needs to start with a certain number of zeroes in the hash. Other criteria of the hash of the prior block may also be used, depending on the implementation of the blockchain.

In a voting process, the nodes in a blockchain system may vote to determine the content of a new block. Depending on the embodiment, a selected subset of nodes or all nodes in the blockchain system may participate in the votes. When there are multiple candidate new blocks that include different transactions are available, the nodes will vote for one of the blocks to be linked to the existing block. The voting may be based on the voting power of the nodes.

By way of example of a block generation process using mining, in generating the hash of prior block 762, a node may randomly combine a version of the prior block 750 with a random nonce to generate a hash. The generated hash is somewhat a random number due to the random nonce. The node compares the generated hash with the criteria of the blockchain system to check if the criteria are met (e.g., whether the generated hash starts with a certain number of zeroes in the hash). If the generated hash fails to meet the criteria, the node tries another random nonce to generate another hash. The process is repeated for different nodes in the blockchain network until one of the nodes finds a hash that satisfies the criteria. The nonce that is used to generate the satisfactory hash is the nonce 764. The node that first generates the hash 762 may also select what transactions that are broadcasted to the blockchain network are to be included in the block 760. The node may check the validity of the transaction (e.g., whether the transaction can be traced back to a prior recorded transaction and whether the digital signature of the generator of the transaction is valid). The selection may also depend on the number of broadcasted transactions that are pending to be recorded and also the fees that may be specified in the transactions. For example, in some embodiments, each transaction may be associated with a fee (e.g., gas) for having the transaction recorded. After the transactions are selected and the data of the block 760 is fixed, the nodes in the blockchain network repeat the trial and error process to generate the hash of prior block 772 by trying different nonce. In embodiments that use voting to generate new blocks, a nonce may not be needed. A new block may be linked to the prior block by including the hash of the prior block.

New blocks may be continued to be generated through the block generation process. A transaction of a blockchain-based unit (e.g., an electronic coin, a blockchain token, etc.) is complete when the broadcasted transaction is recorded in a block. In some embodiments, the transaction is considered settled when the transaction is considered final. A transaction is considered final when there are multiple subsequent blocks generated and linked to the block that records the transaction.

In some embodiments, some of the transactions 756, 758, 766, 768, 776, 778, etc. may include one or more smart contracts. The code instructions of the smart contracts are recorded in the block and are often immutable. When conditions are met, the code instructions of the smart contract are triggered. The code instructions may cause a computer (e.g., a virtual machine of the blockchain) to carry out some actions such as generating a blockchain-based unit and broadcasting a transaction documenting the generation to the blockchain network for recordation.

Computing Machine Architecture

Figure 8:
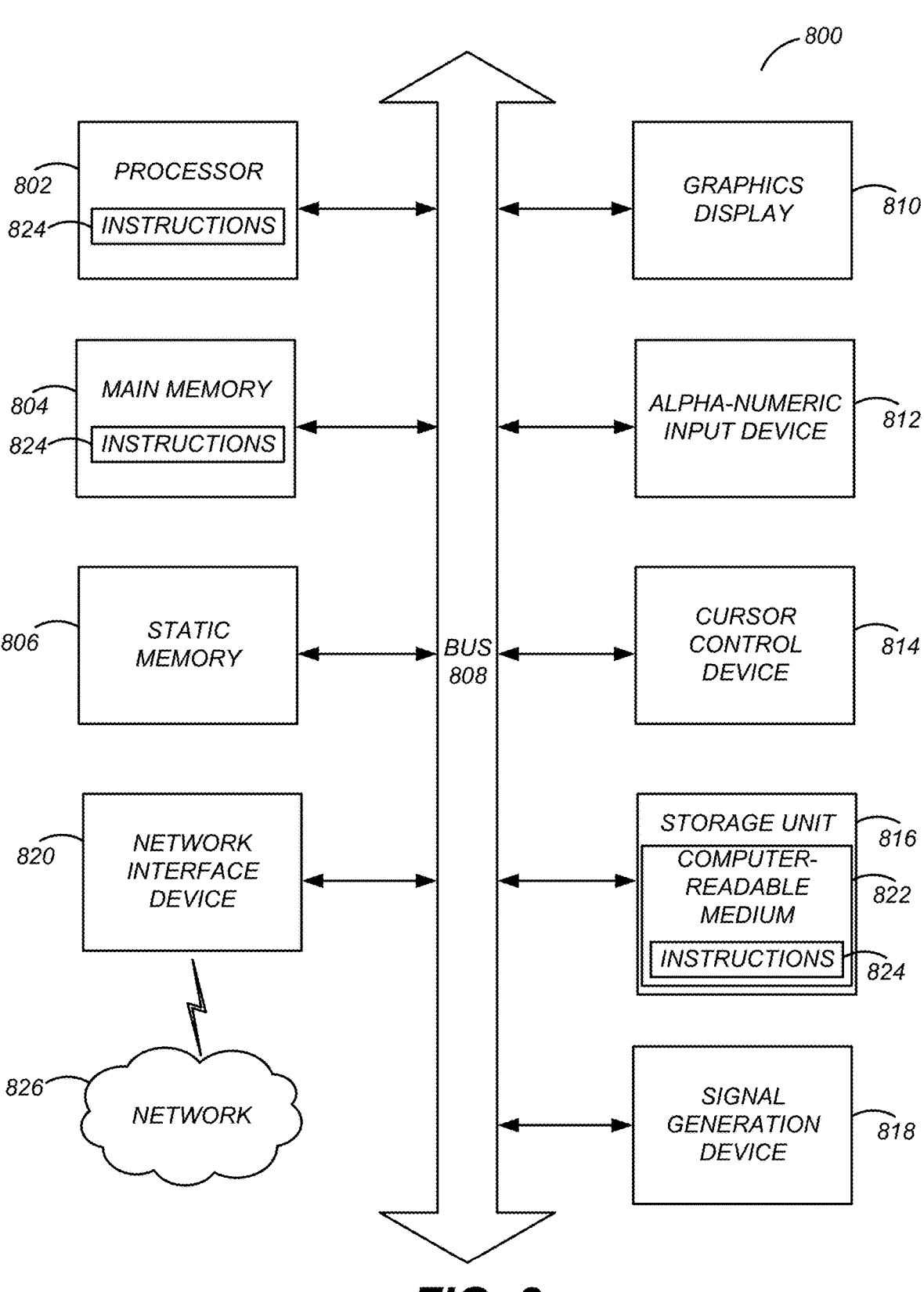
FIG. 8 is a block diagram illustrating components of an example computing machine that is capable of reading instructions from a computer-readable medium and execute them in a processor (or controller).

FIG. 8 is a block diagram illustrating components of an example computing machine that is capable of reading instructions from a computer-readable medium and execute them in a processor (or controller). A computer described herein may include a single computing machine shown in FIG. 8, a virtual machine, a distributed computing system that includes multiples nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2, including but not limited to, the user device 110, the gating requirement platform 130, a node of a blockchain network, and various engines, modules interfaces, terminals, and machines shown in FIG. 2. While FIG. 8 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors (generally, processor 802) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

ADDITIONAL CONFIGURATION CONSIDERATIONS

Gated wrappers may take the form of smart contracts that can interpret the requirements for interaction with a blockchain resource and enforce those requirements using various processes described by the contract administrator. These requirements offer gating for the smart contract limiting the scope of blockchain addresses that can successfully interact with the contract. Gated tokens, which are created through the gated wrapper contract, enable a variety of new applications that can securely operate on public blockchains while limiting accessibility for blockchain addresses verified with gating requirements. Examples can include but are not necessarily limited to gated tokens requiring identity verifications.

Beneficially, with various embodiments described in this disclosure, using gated units can enable blockchain transactions to meet financial transfer regulations or allow decentralized exchanges to operate compliant liquidity pools and trading pairs without changing the current infrastructure. Various embodiments disclosed herein can offer communities and marketplaces a permissioned token only available for community members and enable in-game currencies and different industries to create tokens that are only available to specific blockchain addresses.

Certain embodiments are described herein as including logic or a number of components, engines, modules, or mechanisms, for example, as illustrated in FIG. 2. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A computer-implemented method, comprising:
   causing a gated autonomous program protocol to be stored on a blockchain, wherein the gated autonomous program protocol is configured to exchange a quantity of a financial instrument with a gated wrapped blockchain unit, the gated wrapped blockchain unit transferrable among blockchain addresses that satisfy one or more gating requirements, the one or more gating requirements including an access control requirement for use of the gated wrapped blockchain unit;

verifying that an account associated with a particular blockchain address of the blockchain satisfies the one or more gating requirements that include the access control requirement for use of the gated wrapped blockchain unit; and causing an issuance of an on-chain verification proof that proves that the particular blockchain address satisfies the one or more gating requirements, the on-chain verification proof being stored in a ledger located at an address of a verification autonomous program protocol stored on the blockchain, the on-chain verification proof including the particular blockchain address and serving as an on-chain representation that the particular blockchain address is verified with the one or more gating requirements, wherein the gated autonomous program protocol is configured to direct a validity check of the on-chain verification proof at the address of the ledger to verify the particular blockchain address is associated with the on-chain verification proof before approving a transaction request associated with the gated wrapped blockchain unit that is initiated by the particular blockchain address, thereby verifying the access control requirements for use of the gated wrapped blockchain unit.

2. The computer-implemented method of claim 1, wherein the gated autonomous program protocol comprises instructions, the instructions, when executed, cause one or more processors to:

receive the transaction request from the particular blockchain address requesting to exchange the quantity of the financial instrument with the quantity of gated wrapped blockchain unit;

verify that the particular blockchain address is associated with the on-chain verification proof;

hold the quantity of the financial instrument in custody; and issue the quantity of the gated wrapped blockchain unit to the particular blockchain address.

3. The computer-implemented method of claim 1, wherein the gated autonomous program protocol is a reprogrammable blockchain unit protocol that allows for dynamic alterations of blockchain unit attributes.

4. The computer-implemented method of claim 1, wherein the gated autonomous program protocol is a customization protocol that allows creation of blockchain units with user-defined characteristics, the computer-implemented method further comprises:

enabling an issuer to configure modifiable attributes to tailer the gated wrapped blockchain unit;

deploying the gated wrapped blockchain unit with the modifiable attributes.

5. The computer-implemented method of claim 1, wherein at least one of the one or more gating requirements is verified off-chain.

6. The computer-implemented method of claim 1, wherein the on-chain verification proof is issued by a second autonomous program protocol which comprises instructions, wherein the instructions, when executed, cause one or more processors:

initiating a cross-chain token protocol that facilitates the issuance of a blockchain unit on a primary blockchain and its corresponding wrapped version on a secondary blockchain;

recording transactions of the corresponding wrapped version on the primary blockchain and the secondary blockchain.

7. The computer-implemented method of claim 1, wherein at least one of the one or more gating requirements is verified by an oracle machine, and the at least one of one or more gating requirements are adjustable.

8. The computer-implemented method of claim 7, wherein the oracle machine is in communications with a plurality of autonomous program protocols that are stored one or more blockchains, the plurality of autonomous program protocols are configured to issue on-chain verification proofs with respect to different types of gated wrapped blockchain units.

9. The computer-implemented method of claim 8, wherein the different types of gated wrapped blockchain units are associated with same gating requirements that are verified by the oracle machine.

10. The computer-implemented method of claim 1, wherein causing an issuance of the on-chain verification proof comprises causing a non-fungible token to be specifically issued to the particular blockchain address, the non-fungible token being at least part of the on-chain verification proof.

11. The computer-implemented method of claim 1, further comprising:

establishing a reverse wrapper protocol on the blockchain, wherein the reverse wrapper protocol is configured to convert the gated wrapper blockchain unit into non-wrapper blockchain unit;

receiving a request from a blockchain address to reverse wrap the gated wrapper blockchain unit; and issuing a non-verified version of blockchain unit corresponding to the gated wrapper blockchain unit.

12. The computer-implemented method of claim 1, wherein the transaction request is a transfer request, wherein the gated autonomous program protocol comprises instructions, the instructions, when executed, cause one or more processors to:

receive a transfer request from the particular blockchain address to transfer a quantity of the gated wrapped blockchain unit to a second blockchain address;

verify that the particular blockchain address is associated with the on-chain verification proof; and generating a ledger entry of the gated autonomous program protocol to be recorded to the blockchain that reflects the quantity of the gated wrapped blockchain unit is transferred from the particular blockchain address to the second blockchain address.

13. A system, comprising:

a verification autonomous program protocol that is stored on a blockchain, the verification autonomous program protocol comprising a first set of instructions, the instructions, when executed, cause one or more first processors to:

receive a verification that an account associated with a particular blockchain address of the blockchain satisfies one or more gating requirements, the one or more gating requirements including an access control requirement for use of a gated wrapped blockchain unit; and issue an on-chain verification proof that proves that the particular blockchain address satisfies the one or more gating requirements the particular blockchain address, the on-chain verification proof being stored in a ledger located at an address of the verification autonomous program protocol stored on the blockchain, the on-chain verification proof including the particular blockchain address and serving as an on-chain representation that the particular blockchain address is verified with the one or more gating requirements; and the gated autonomous program protocol that is stored on the blockchain, the gated autonomous program protocol comprising a second set of instructions, the instructions, when executed, cause one or more second processors to:

exchange a quantity of a financial instrument with a gated wrapped blockchain unit, the gated wrapped blockchain unit transferrable among blockchain addresses that satisfy the one or more gating requirements;

receive a transaction request associated with the gated wrapped blockchain, the transaction request initiated by the particular blockchain address;

direct a validity check of the on-chain verification proof at the address of the ledger to verify the on-chain verification proof; and approve, responsive to verifying the access control requirements for use of the gated wrapped blockchain unit, the transaction request.

14. The system of claim 13, wherein the gated autonomous program protocol is a reprogrammable blockchain unit protocol that allows for dynamic alterations of blockchain unit attributes.

15. The system of claim 13, wherein the gated autonomous program protocol is a customization protocol that allows creation of blockchain units with user-defined characteristics, the gated autonomous program protocol is further configured to:

enable an issuer to configure modifiable attributes to tailer the gated wrapped blockchain unit;

deploy the gated wrapped blockchain unit with the modifiable attributes.

16. The system of claim 13, further comprising a reverse wrapper protocol on the blockchain, wherein the reverse wrapper protocol is configured to convert the gated wrapper blockchain unit into non-wrapper blockchain unit, the reverse wrapper protocol is configured to:

receive a request from a blockchain address to reverse wrap the gated wrapper blockchain unit; and issue a non-verified version of blockchain unit corresponding to the gated wrapper blockchain unit.

17. One or more non-transitory computer-readable media configured to store a gated autonomous program protocol that operates on a blockchain, the gated autonomous program protocol comprising instructions, wherein the instructions, when executed by one or more processors, cause the one or more processors to:

exchange a quantity of a financial instrument with a gated wrapped blockchain unit, the gated wrapped blockchain unit transferrable among blockchain addresses that satisfy one or more gating requirements, the one or more gating requirements including an access control requirement for use of the gated wrapped blockchain unit;

receive a transaction request associated with the gated wrapped blockchain, the transaction request initiated by a particular blockchain address;

direct a validity check of an on-chain verification proof at the address of a ledger to verify the on-chain verification proof, the ledger located at an address of the ledger of a verification autonomous program protocol stored on the blockchain, wherein the on-chain verification proof is issued to prove that the particular blockchain address satisfies the one or more gating requirements and is stored in the ledger located at an address of the ledger on the blockchain, the on-chain verification proof including the particular blockchain address and serving as an on-chain representation that the particular blockchain address is verified with the one or more gating requirements; and approve, responsive to verifying the access control requirements for use of the gated wrapped blockchain unit, the transaction request.

18. The one or more non-transitory computer-readable media of claim 17, wherein the gated autonomous program protocol is a reprogrammable blockchain unit protocol that allows for dynamic alterations of blockchain unit attributes.

19. The one or more non-transitory computer-readable media of claim 17, wherein the gated autonomous program protocol is a customization protocol that allows creation of blockchain units with user-defined characteristics, the gated autonomous program protocol is further configured to:

enable an issuer to configure modifiable attributes to tailer the gated wrapped blockchain unit;

deploy the gated wrapped blockchain unit with the modifiable attributes.

20. The one or more non-transitory computer-readable media of claim 17, wherein the instructions, when executed, further causes the one or more processors to:

establish a reverse wrapper protocol on the blockchain, wherein the reverse wrapper protocol is configured to convert the gated wrapper blockchain unit into non-wrapper blockchain unit;

receive a request from a blockchain address to reverse wrap the gated wrapper blockchain unit; and issue a non-verified version of blockchain unit corresponding to the gated wrapper blockchain unit.

* * * * *